United States Patent
Russell et al.

(10) Patent No.: US 6,633,584 B1
(45) Date of Patent: Oct. 14, 2003

(54) PAYLOAD TRANSLATION BETWEEN FRAME OPTIONS IN SYNCHRONOUS DIGITAL HIERARCHY NETWORKS

(75) Inventors: John Paul Russell, Sawbridgeworth (GB); David Michael Goodman, St Albans (GB); Christopher Thomas William Ramsden, Hertford (GB); Christopher David Murton, Chelmsford (GB); James Shields, Ottawa (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/218,110

(22) Filed: Dec. 21, 1998

(51) Int. Cl.[7] .................................................. H04J 3/16
(52) U.S. Cl. ....................................................... 370/466
(58) Field of Search ................................. 370/466–468, 370/401–408, 410, 471, 496, 522, 216, 352, 389–392, 524, 505, 503, 465, 360, 535; 710/62; 709/230–238, 249; 375/372; 713/201; 455/414

(56) References Cited

U.S. PATENT DOCUMENTS

| | | | | |
|---|---|---|---|---|
| 5,574,717 A | * | 11/1996 | Tomizawa et al. | 370/244 |
| 5,717,693 A | * | 2/1998 | Baydar et al. | 370/514 |
| 5,754,545 A | * | 5/1998 | Shinbashi et al. | 370/360 |
| 5,857,092 A | * | 1/1999 | Nakamura et al. | 370/466 |
| 6,011,802 A | * | 1/2000 | Norman | 370/466 |
| 6,014,708 A | * | 1/2000 | Klish | 709/232 |
| 6,058,119 A | * | 5/2000 | Engbersen et al. | 370/466 |
| 6,246,668 B1 | * | 6/2001 | Kusyk | 370/228 |
| 6,426,958 B1 | * | 7/2002 | Crossett, III et al. | 370/466 |

OTHER PUBLICATIONS

U.S. patent application Ser. No. 09/143,465, Russell.
U.S. patent application Ser. No. 09/143,466, Russell.
U.S. patent application Ser. No. 09/166,184, Russell.

* cited by examiner

*Primary Examiner*—Kwang Bin Yao
*Assistant Examiner*—Prenell Jones
(74) *Attorney, Agent, or Firm*—Barnes & Thornburg

(57) ABSTRACT

There is disclosed a method of converting synchronously between a plurality of VC-3 container streams and a plurality of STS-1 synchronous payload envelope streams within the synchronous digital hierarchy. A stream of VC-3 containers is converted to a stream of STS-1 SPEs by reading the VC-3s in a VC-4 container stream, adding redundant byte columns to each VC-3 stream and re-writing said VC-3 streams to an STS-3 synchronous payload envelope stream. Conversely, a plurality of STS-1 synchronous payload envelope streams are converted to a plurality of VC-3 virtual container streams by reading the STS-1 SPE streams from an STS-3C SPE stream; removing redundant stuff byte columns from each STS-1 SPE stream; writing the STS-1 SPE streams to a VC-4 virtual container stream; recalculating pointer positions, writing pointer bytes to the VC-4 stream, and adding a plurality of redundant stuff bytes to the VC-4 container stream.

34 Claims, 21 Drawing Sheets

SONET and SDH Terms

| SDH | SONET |
|---|---|
| STM-Nopt (N=1, 4, 16, 64) | OC-n (n=1, 3, 12, 48, 192) |
| STM-Nel (N=1, 4, 16, 64) | STS-n (n=1, 3, 12, 48, 192) |
| Section Overhead (SOH) | Transport Overhead (TOH) |
| Regenerator SOH (RSOH) | Section Overhead |
| Multiplex SOH (MSOH) | Line Overhead |
| Administrative Unit<br>AU-4, AU-3 | (No Equivalent Name)<br>AU-3 = STS-1 frame -- TOH rows 1-3 & 5-9 |
| AU Pointer<br>AU-4 pointer, AU-3 pointer | STS Payload Pointer<br>STS Payload Pointer = AU-3 pointer |
| Higher Order Virtual Container<br>VC-4, VC-3 | STS Synchronous Payload Envelope (SPE)<br>STS-1 SPE = VC-3 |
| Tributary Unit<br>TU-11, TU-12, TU-2, TU-3 | Virtual Tributary<br>VT1.5 = TU-11<br>VT2 = TU-12<br>VT6 = TU-2 |
| Lower Order Virtual Container:<br>VC-11, VC-12, VC-2, VC-3 | VT payload<br>VT1.5 payload = VC-11<br>VT2 payload = VC-12<br>VT6 payload = VC-2 |
| Higher Order Path Overhead<br>VC-4/VC-3 POH | STS Path Overhead |
| Lower Order Path Overhead<br>VC-2/VC-1 POH | VT Path Overhead |

Fig. 2
(Prior Art)

PAYLOAD TRANSLATION BETWEEN FRAME OPTIONS IN SYNCHRONOUS DIGITAL HIERARCHY NETWORKS

FIELD OF THE INVENTION

The present invention relates to synchronous digital networks and particularly, although not exclusively to conversion of payload data between ETSI derived containers and SONET containers within synchronous digital hierarchy networks.

BACKGROUND TO THE INVENTION

In the applicants co-pending U.S. patent applications Ser. No. 09/143466 entitled "Frame Based Data Transmission Over Synchronous Digital Hierarchy Network", and Ser. No. 09/143465 entitled "Payload Mapping In Synchronous Networks", and the applicant's U.S. patent application Ser. No. 09/166,184 entitled "Concatenation of Containers in Synchronous Digital Hierarchy Network", copies of which are filed herewith and the contents of which are incorporated herein, there is disclosed a method and apparatus for carrying frame based data over synchronous digital hierarchy (SDH) transport networks wherein the frame based data eg Ethernet data according to IEEE Standard 802.3, has an inherent data rate which does not conveniently match the telecoms data rates specified in ITU-T recommendations G.707 and G.708 for containers and tributary unit groups (TUGS). In the applicant's previous disclosures, frame based data packets at a first (higher) data rate are mapped into a plurality of virtual container (VC) streams, each operating at a second (lower) data rate. For example a stream of 10 Mbits/s Ethernet data frames may be mapped into a plurality of five 2 Mbits/s virtual container streams and transported across a network to a destination in five parallel transmitted virtual container stream channels. On reaching the destination, the data frames are reconstructed from a plurality of payloads of the virtual container streams.

By incorporating the frame based data directly into synchronous transmission channels, the above disclosed methods may provide a functionality which has previously been available over a limited distance in a local area network, but extended over distances which have previously been regarded as being wide area networks, for example over networks spanning between different continents. Conventionally, a feature of SDH networks which span across the Atlantic ocean is that different transmission rates exist between Europe and North America. The known synchronous digital hierarchy multiplexing scheme has developed historically by incorporation of both European multiplexing standards (ETSI standards), and North American synchronous optical network (SONET) standards and Bellcore GR 253 standard, and is derived from a combination of different bit rate multiplex schemes. Large amounts of legacy network equipment exist in Europe, operating at the ETSI derived bit rates within the synchronous digital hierarchy, and in North America, operating at SONET bit rates within the synchronous digital hierarchy. In most cases a global network operator would wish to use either ETSI derived SDH equipment within a single territory, or SONET based SDH equipment and not convert data traffic between two different systems within a same territory, but only convert between ETSI and SONET data rates when spanning between networks across international boundaries. Within the synchronous digital hierarchy regime there are points of equivalence between the ETSI derived bit rates and the SONET derived bit rates. For example a VC-4 container is of equivalent bit rate and bit capacity to a SONET STS-3C frame. However, the VC4/STS-3C bit rate of approximately 155 MBits/s is too large for global network operators to offer to their customers for provision of individual globalized circuit and trunk services spanning across national borders and across both European and North American territories.

The practical problems of providing a frame based data network carried over a synchronous network across national boundaries include interfacing between ETSI and SONET options for most data traffic types within SDH, which involves provision of different equipment types which operate at ETSI and SONET data rates, as well as providing equipment and protocols to convert from ETSI derived synchronous bit rates, via plesiochronous bit rates to SONET bit rates and vice versa.

In order to implement the applicant's above disclosed frame based data communications system in an SDH network spanning between ETSI and SONET domains, there is a requirement for translation of payload between ETSI and SONET frame options within SDH.

Although specific implementations of the present invention have arisen from addressing the problem of carrying frame based data over SDH networks, the implementations address a more general need for provision of translation of data between ETSI and SONET options within SDH, without having to convert through an intermediate plesiochronous mode.

SUMMARY OF THE INVENTION

One object in the present invention is to provide a method and apparatus for converting data between ETSI derived and SONET derived data rates within a synchronous digital hierarchy network in an efficient manner.

Another object of specific implementations of the present invention is to minimize an amount of latency within a data network.

A further object of specific implementations of the present invention is to provide efficient conversion between ETSI and SONET data rates at a lower level of granularity than is available by translating between the VC-4 and STS-3C containers.

Specific implementations of the present invention may convert between SONET and ETSI derived data rates without recourse to plesiochronous digital hierarchy data rates.

According to a first aspect of the present invention there is provided a method of converting payload data between a VC-3 virtual container and an STS-1 synchronous payload envelope, said method comprising the steps of reading a first set of pointer bytes, said first set of pointer bytes pointing to a position within said VC-4 virtual container of each of a plurality of VC-3 virtual containers; reading bytes of first, second and third VC-3 virtual containers from positions within said VC-4 virtual container indicated by said first set of pointer bytes; generating an STS-3C synchronous payload envelope; determining start positions within an STS-3C synchronous payload envelope of each of a plurality of STS-1 synchronous payload envelopes; determining positions within said STS-1 synchronous payload envelopes of each of a plurality of redundant stuff bytes; determining a set of STS-1 synchronous payload envelopes pointer byte values for pointing to said start positions of said plurality of STS-1 synchronous payload envelopes within said STS-3C synchronous payload envelopes; determining a set of pointer byte values for pointing to said positions of said redundant stuff bytes within said STS-1 synchronous payload envelopes; and writing said bytes of said first, second and third VC-3 virtual containers into positions within said STS-3C synchronous payload envelopes allocated for said plurality of said STS-1 SPEs.

Said method may further comprise the steps of reading a second set of pointer bytes, said second set of pointer bytes indicating a start of said VC-4 virtual container within an STM-1 frame.

Said step of determining positions within an STS-1 synchronous payload envelope of each of a plurality of redundant stuff bytes preferably comprises writing a said STS-1 synchronous payload envelope as a 9 byte row×87 byte column array; and setting said plurality of redundant stuff bytes as occupying a $30^{th}$ said column of bytes and a $59^{th}$ said column of bytes.

Preferably said step of determining a set of pointer byte values for pointing to said positions of said redundant stuff bytes within a said STS-1 synchronous payload envelope comprises writing said STS-1 synchronous payload envelope as a 9 byte row×87 byte column array, and setting said pointer byte values to point to a first byte of a $30^{th}$ said column and to a first byte of a $59^{th}$ said column.

Said step of determining start positions within the STS-3C synchronous payload envelope of each of a plurality of STS-1 synchronous payload envelopes may comprise the steps of allocating a memory area for storing an array of 9 rows of bytes×261 columns of bytes; and setting said start positions of said plurality of said STS-1 synchronous payload envelopes as being at a first byte of a first said column, a first byte of a second said column and a first byte of a third said column.

Said step of writing bytes of said first, second and third VC-3 virtual containers into STS-3C synchronous payload envelopes may comprise writing each of a plurality of columns of a said VC-3 container to a corresponding respective column in a 9 byte×261 byte memory array comprising a said STS-3C synchronous payload envelope.

Said step of writing bytes of said first, second and third VC-3 virtual containers into positions allocated for said SPS-1 synchronous payload envelopes may comprise the steps of writing a plurality of columns of said VC-3 virtual containers into columns of a 9 byte row×261 byte column memory array, at positions of the $1^{st}$ to $29^{th}$ byte columns, the $31^{st}$ to $58^{th}$ byte columns, $60^{th}$ to $87^{th}$ byte columns, $89^{th}$ to $116^{th}$ byte columns, $118^{th}$ to $146^{th}$ byte columns, $147^{th}$ to $175^{th}$ byte columns, $178^{th}$ to $204^{th}$ byte columns, $209^{th}$ to $235^{th}$ byte columns and $234^{th}$ to $261^{st}$ byte columns.

Said method may comprise the steps of reading an STM-1 frame containing a said VC-4 virtual container; reading a third set of pointer bytes from a section overhead of said STM-1 frame, said third set of pointer bytes indicating a start position of said VC-4 virtual container within STM-1 frame.

The invention includes apparatus for converting payload data between a VC-3 virtual container and an STS-1 synchronous payload envelope, said apparatus comprising pointer processing means capable of reading a first set of pointer bytes, said first set of pointer bytes pointing to a position within said VC-4 virtual container of each of a plurality of VC-3 virtual containers; memory means arranged for storing first, second and third read VC-3 virtual containers from positions within said VC-4 virtual container indicated by said first set of pointer bytes; pointer processing means capable of determining start positions within an STS-3C synchronous payload envelope of a plurality of STS-1 synchronous payload envelopes; pointer processing means capable of determining positions within said STS-1 synchronous payload envelopes of a plurality of redundant stuff bytes; pointer processing means capable of determining a set of pointer byte values for pointing to said start positions of said STS-1 synchronous payload envelopes within said STS-3C synchronous payload envelopes; pointer processing means capable of determining a set of pointer byte values for pointing to said positions of said redundant stuff bytes within said STS-1 synchronous payload envelopes; and memory means arranged for storing said VC-3 virtual container payload data in a memory area allocated for said STS-3C synchronous payload envelope at memory positions corresponding to said plurality of said STS-1 SPEs within said STS-3C SPE.

The receiver means is capable of receiving a VC-4 virtual container stream. The transmitter means is capable of transmitting a stream of STS-3C synchronous payload envelopes.

According to a second aspect of the present invention there is provided a method of converting payload data between a VC-3 virtual container and an STS-1 synchronous payload envelope, said method comprising the steps of: reading an STS-3C synchronous payload envelope, said STS-3C synchronous payload envelope containing a plurality of STS-1 synchronous payload envelopes; generating a VC-4 virtual container; writing said plurality of STS-1 synchronous payload envelopes to said VC-4 virtual container; determining values for a plurality of VC-3 virtual container pointers for identifying positions of said VC-3 containers within said VC-4; writing said VC-3 pointer values as VC-3 pointer bytes within said VC-4 container; and writing a plurality of stuff bytes to said VC-4 container.

Preferably, the method further comprises the step of removing redundant stuff bytes from said plurality of STS-1 synchronous payload envelopes prior to said step of writing said plurality of STS-1 synchronous payload envelopes to said VC-4 container.

Said plurality of STS-1 synchronous payload envelopes may be written to said VC-4 container as a plurality of byte columns, first, second and third said STS-1 synchronous payload envelopes each comprising a plurality of said byte columns, said plurality of STS-1 synchronous payload envelopes being written to said VC-4 container such that said byte columns of said first, second and third STS-1 synchronous payload envelopes are interleaved with each other within said VC-4 container.

Said step of determining values of said VC-3 pointers may comprise setting a first pointer value to refer to a position in a 9 byte row×261 byte column array at a first row and seventh column of said array; setting a second pointer value to point to a position in said 9 byte row×261 byte column array at a first row and eighth column of said array; and setting a third pointer value to point to a position in said 9 byte row×261 byte column array at a first row and ninth column of said array.

Preferably the method further comprises the step of receiving an STS-3 frame containing said STS-3C synchronous payload envelope; and reading a set of pointers indicating start positions of said plurality of STS-1 synchronous payload envelopes within said STS-3C synchronous payload envelope.

Preferably the method further comprises the step of receiving an STS-3 frame containing an STS-3C synchronous payload envelope; and reading a set of pointers within a section overhead of said STS-3 frame, said pointers indicating a start position of said STS-3 synchronous payload envelope within said STS-3 frame.

The invention includes apparatus for converting payload data between a VC-3 virtual container and an STS-1 synchronous payload envelope, said apparatus comprising receiver means for receiving an STS-3C synchronous payload envelope, said STS-3C synchronous payload envelope containing a plurality of STS-1 synchronous payload envelopes; memory means arranged for storing said plurality of STS-1 synchronous payload envelopes received by said receiver means within a memory area arranged to store a VC-4 container; pointer processing means capable of generating VC-3 virtual container pointer bytes, and writing said VC-3 pointer bytes within said memory area allocated to said VC-4 container; and pointer processing means capable of generating a set of VC-4 overhead bytes and writing said overhead bytes to said memory area allocated for storing said VC-4 container.

Said memory area arranged to store a VC-4 container preferably comprises a 9 byte row×261 byte column memory array. Preferably the apparatus comprises transmitter means for transmitting an STS-3 frame containing the contents of a VC-4 virtual container.

Preferably the apparatus comprises STM-1 frame section overhead processor means capable of generating a set of STM-1 frame section overhead bytes, said STM-1 frame overhead processor receiving a set of AU-4 pointer bytes from said pointer processor means, wherein said STM-1 frame overhead processor means operates to incorporate said AU-4 pointer bytes within an STM-1 section overhead.

According to a fourth aspect of the present invention there is provided a method of synchronously converting data between a plurality of VC-3 container streams and a plurality of STS-1 synchronous payload envelope streams, said method comprising the steps of: receiving a VC-4 container stream containing said plurality of VC-3 container streams; identifying each said VC-3 container stream within said VC-4 container stream and reading each said VC-3 container stream; adding redundant stuff bytes to each said VC-3 container stream; writing said plurality of VC-3 container streams to a stream of 9 byte column×261 byte row STS-3C synchronous payload envelopes.

Preferably said method further comprises writing said stream of STS-3C synchronous payload envelopes to a stream of STS-3 frames.

Said step of writing said STS-3C synchronous payload envelope stream to said STS-3 frame stream may comprise for each STS-3 frame, determining a pointer value indicating a start position of a said STS-3C synchronous payload envelope within said STS-3 frame.

Said step of writing said stream of STS-3C synchronous payload envelopes to said stream of STS-3 frames preferably comprises determining a set of pointer values indicating a start position of a plurality of STS-1 synchronous payload envelopes, within each said STS-3 synchronous payload envelope of said STS-3C synchronous payload envelope stream.

According to a fourth aspect of the present invention there is provided a method of synchronously converting a stream of STS-1 synchronous payload envelopes to a stream of VC-3 virtual containers, said method comprising the steps of reading a stream of STS-3C synchronous payload envelopes, said STS-3 synchronous payload envelope stream containing a plurality of streams of said STS-1 synchronous payload envelopes; for each STS-3 synchronous payload envelope, identifying a start position of each of a plurality of STS-1 synchronous payload envelopes contained within said STS-3C synchronous payload envelope; for each STS-1 synchronous payload envelope, removing a plurality of redundant stuff bytes; writing said plurality of STS-1 synchronous payload envelope streams to a stream of 9 byte column×255 byte row containers; to each said 9 byte×255 byte container, pre-pending a set of pointer bytes indicating start positions of each of a plurality of said STS-1 synchronous payload envelopes within said container; for each said container, adding a plurality of redundant stuff bytes; and for each said container adding a set of container overhead bytes.

Preferably said method further comprises the step of adding a set of STM-1 section overhead bytes to each said container to create an STM-1 frame stream.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 2 illustrates terms used to describe ETSI derived bit rate and multiplex options within the synchronous digital hierarchy, and their nearest SONET option equivalents;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

Figure 1:
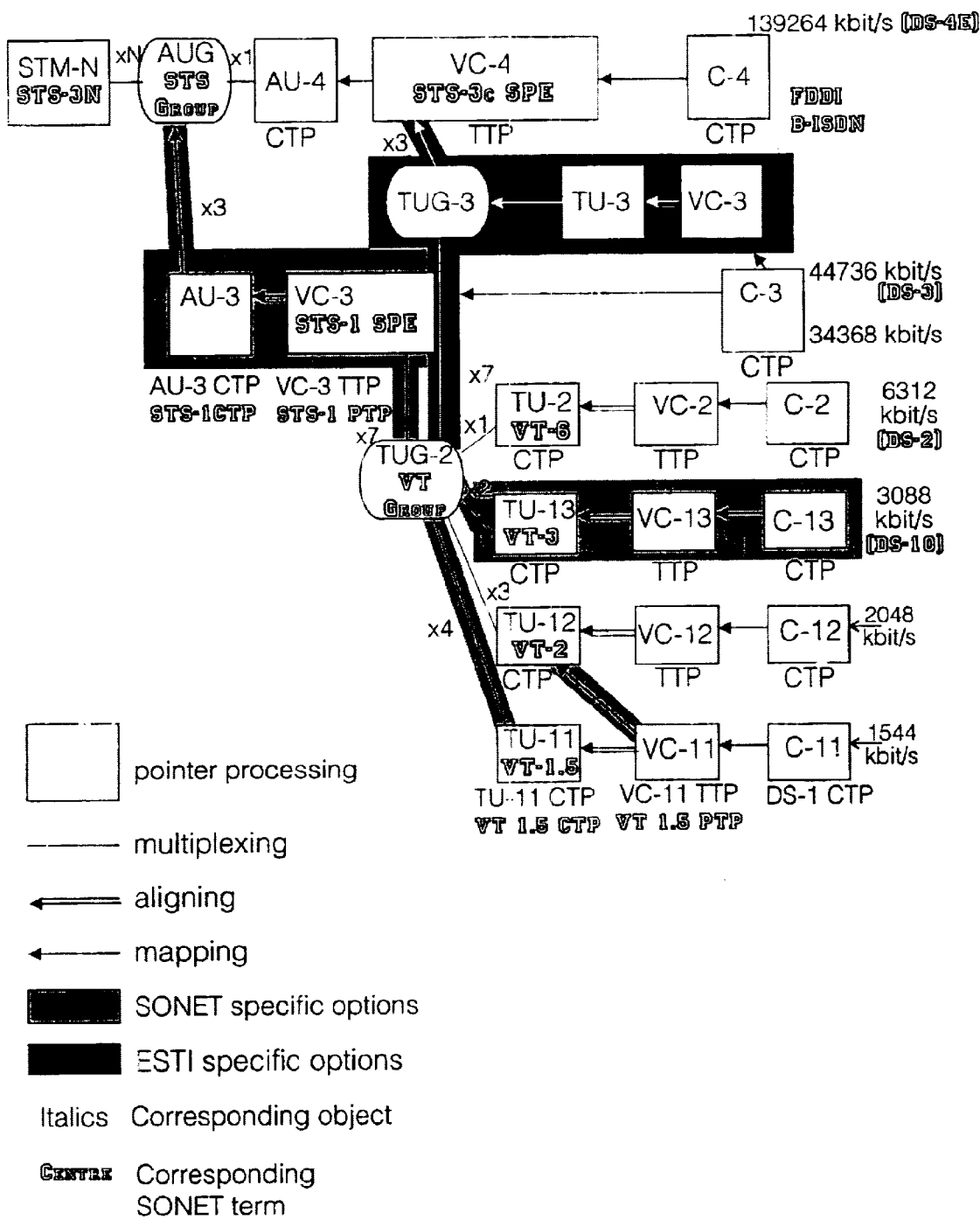
FIG. 1 illustrates schematically a synchronous digital hierarchy multiplexing structure describing the European ETSI derived bit rates, and North American SONET derived bit rate options.

Referring to FIG. 1 herein, there is illustrated a prior art synchronous digital hierarchy multiplexing structure including both SONET specific and ETSI specific bit rate options. A comparison of the various SDH terms referred to in FIG. 1 is illustrated with reference to FIG. 2 herein.

In FIG. 2 herein, the terms described are currently used inconsistently by those skilled in the art. For example, the STS term is used by those skilled in the art to describe both a payload, and an electrical interface. In this specification, the term "STS" is used to describe payloads only. In this specification, the SDH ETSI term of "virtual container" (VC) is equivalent to an SDH (SONET) STS synchronous payload envelope (SPE), and both are referred to herein as "containers". SONET bit rates arise from the prior art Bellcore standard bit rates commonly used throughout North America, whilst the known ETSI bit rates are commonly used in Europe and elsewhere. SONET rate tributaries are input into the SDH multiplexing structure at 1544 KBits/s (DS-1), 3088 KBits/s (DS-1C), 6312 KBits/s (DS-2), 44736 KBits/s (DS-3), and 139264 KBits/s (DS4E). ETSI rate tributaries are input into the SDH multiplexing structure at 2048 KBits/s, and 34368 KBits/s. Data can only be transferred directly between ETSI and SONET options whilst maintaining synchronicity at specific points within the hierarchy. For example an ETSI option VC-4 virtual container is directly equivalent to a SONET STS-3C container frame in terms of bit rate and container size, enabling a payload transmitted in VC-4 containers to be received directly and synchronously by a SONET system and incorporated into STS-3C containers and vice versa.

Figure 3:
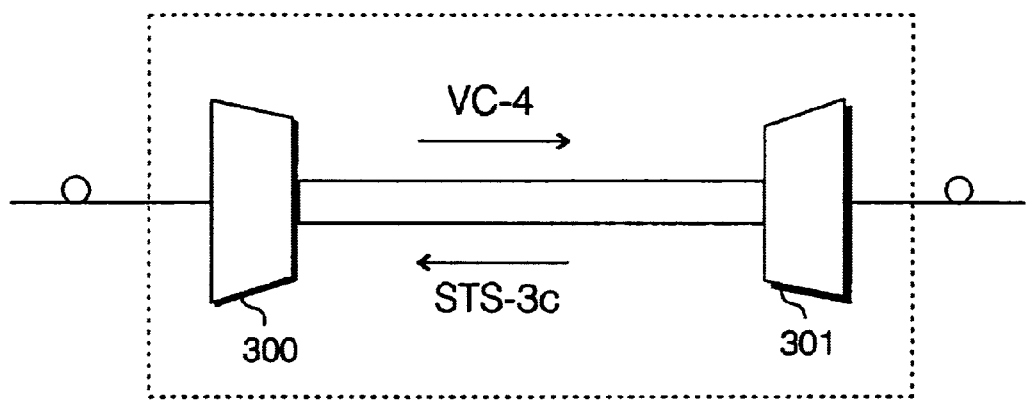
FIG. 3 illustrates schematically a prior art transatlantic communications link between a European ETSI type synchronous network and a North American SONET type synchronous network within a portion of a globalized synchronous digital hierarchy network, carrying data in VC-4 containers in one direction, and STS-3 synchronous payload envelopes in an opposite direction.

Referring to FIG. 3 herein, there is illustrated schematically a prior art channel between a first synchronous network represented by first ETSI specific multiplexer 300, and a second synchronous network represented by a SONET specific multiplexer 301 connected by an optical fiber link. This schematic linking between first and second networks in FIG. 3 may represent for example connection between first and second networks between Europe and continental America. A stream of VC-4 containers may be transmitted in a first direction between first multiplexer 300 and second multiplexer 301, whilst a stream of STS1-3C containers may be transmitted from the second multiplexer 391 to be received by the first multiplexer 300. Transmission between first and second networks is maintained synchronously throughout the link. First ETSI specific multiplexer 300 adds an ETSI specific overhead to a payload to create a VC-4 container, and similarly, SONET specific multiplexer 301 adds a SONET specific overhead to a payload to create an STS1-3C container. Because the ETSI option VC-4 container payload is equivalent in bit rate terms and size to the SONET option STS-3C container, the payloads are directly convertible between VC-4 and STS1-3C containers at either end, whilst maintaining synchronicity. For example, a VC-4 payload may be filled with, for example asynchronous transfer mode (ATM) cells, which are converted between ETSI and SONET option containers in SDH, by replacement of overheads to the payload.

Global network operators use SDH networks to provide services to corporate customers who require communication between offices distributed worldwide. Although there is a point of equivalence within SDH at the level of VC-4 containers and STS-3C containers in terms of bit rate and container size, for most customers of global network operators, the available bit rate of approximately 155 MBits/s corresponding to the VC-4 container is too large. Customers may require provision of services at lower data rates, eg 2 MBits/s, or 10 MBits/s or other rates lower than 155 MBits/s over a geographically extended corporate network. Referring again to FIG. 1 herein, whilst the VC-4 container and STS-3 SPE are interchangeable at a bit rate of 139264 KBits/s, this bit rate is too large to satisfy the needs of transcontinental corporate network users, the alternative of conversion between the available ETSI bit rate options and SONET bit rate options illustrated on the right hand side of FIG. 1 has the problem that the bit rates are too far apart from each other to provide efficient translation of data, and translation would require excessive amounts of buffering in order to convert between those bit rate options.

Figure 4:
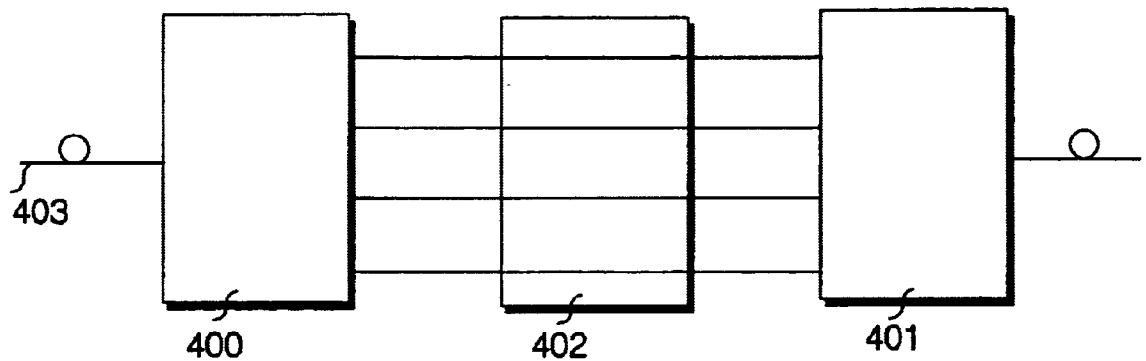
FIG. 4 illustrates schematically a prior art conversion method between ETSI derived and SONET derived bit rate options within a synchronous digital hierarchy network for bit rates lower than 139,264 Kbits/s, incorporating a plesiochronous conversion of data between ETSI derived and SONET derived equipment types.

Conventionally, to convert between ETSI specific and SONET specific options at bit rates below 155 MBits/s, loss of synchronicity by conversion through a plesiochronous digital hierarchy intermediate step must be accepted as illustrated schematically with reference to FIG. 4 herein. In FIG. 4, there is illustrated an ETSI specific SDH multiplexer 400 communicating with a SONET specific SDH multiplexer 401, both the ETSI specific and SONET specific multiplexers operate at bit rates below 155 MBits/s. Conversion of individual channels between ETSI specific and SONET specific multiplexers 400, 401 is made through an intermediate plesiochronous protocol converter 402. An incoming ETSI option SDH signal arriving on first fiber 403 is converted into a plurality of plesiochronous digital hierarchy (PDH) bit streams at rates of 2 MBits/s, 8 MBits/s, 34 MBits/s and 140 MBits/s which are further broken down into PDH paths, so that specific protocol conversions can take place in PDH protocol converter 402. For example, if voice traffic were being carried, then PDH converter 402 may comprise a converter converting ETSI 54 Kbits/s A law companded voice to 56 KBits/s $\mu$ law Bellcore standard channels on the other side of the PDH converter 402. As another example, if the data carried between ETSI and SONET multiplexers 400, 401 is computer generated data, eg. internet protocol (IP) data carried over PDH, then PDH protocol converter 402 may comprise a router, and translation between ETSI and SONET systems would involve conversion to a higher layer within the OSI layer model. A major disadvantage of conversion between ETSI and SONET options within SDH at bit rates lower than 155 MBits/s is that the conversion in PDH protocol convertor 402 involves delay.

Figure 5:
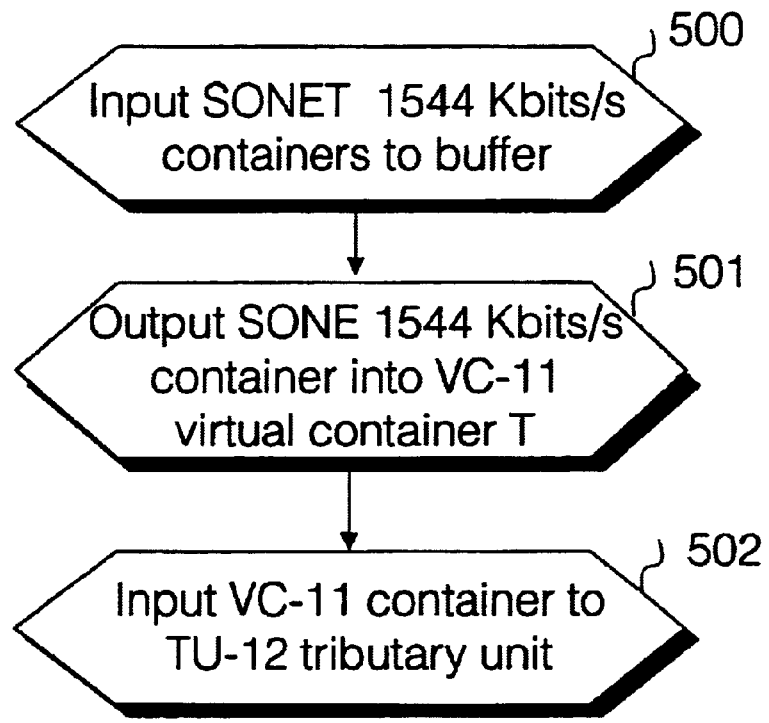
FIG. 5 illustrates schematically main processing steps for a system of carrying 1544 Kbits/s SONET rate tributaries within TU-12 ETSI tributary units within the synchronous digital hierarchy.

One possible solution to providing lower bit rate services spanning both ETSI and SONET equipment is to input a SONET 1554 KBits/s container stream into a buffer, store the SONET containers in the buffer prior whilst outputting to a VC-11 virtual container, and then input the VC-11 virtual container streams into ETSI derived TU-12 tributary units according to the process as illustrated schematically with reference to FIG. 5 herein. However, this scheme has disadvantages. Firstly, this scheme involves carrying a North American Bellcore standard within an SDH standard tributary unit. SONET overhead protocols are encapsulated within SDH (ETSI option) payloads. True equivalence between SDH (ETSI option) and SDH (SONET option) equipment is not achieved and the two equipment types do not operate in a similar or equivalent manner. Secondly, 500 KBits/s of data capacity are wasted every time the 1554 KBits/s container is encapsulated in the TU-12 tributary unit. Therefore, this solution is not optimum.

Similarly, another possible solution, involving translation between ETSI and SONET options at the VC-2 level is non-optimal, since a VC-2 virtual container can only take SONET inputs at 6312 Kbits/s. The nearest ETSI option tributary is approximately 8000 Kbits/s, and so the ETSI option 8000 Kbits/s tributary would not fit into a TUG-2 tributary unit group, and incorporating the ETSI option 8000 Kbits/s tributaries into a TUG-3 would involve multiplexing three 8000 Kbits/s ETSI option tributaries into a 34000 Kbits/s TUG-3, via a plesiochronous digital hierarchy multiplexing scheme.

Figure 6:
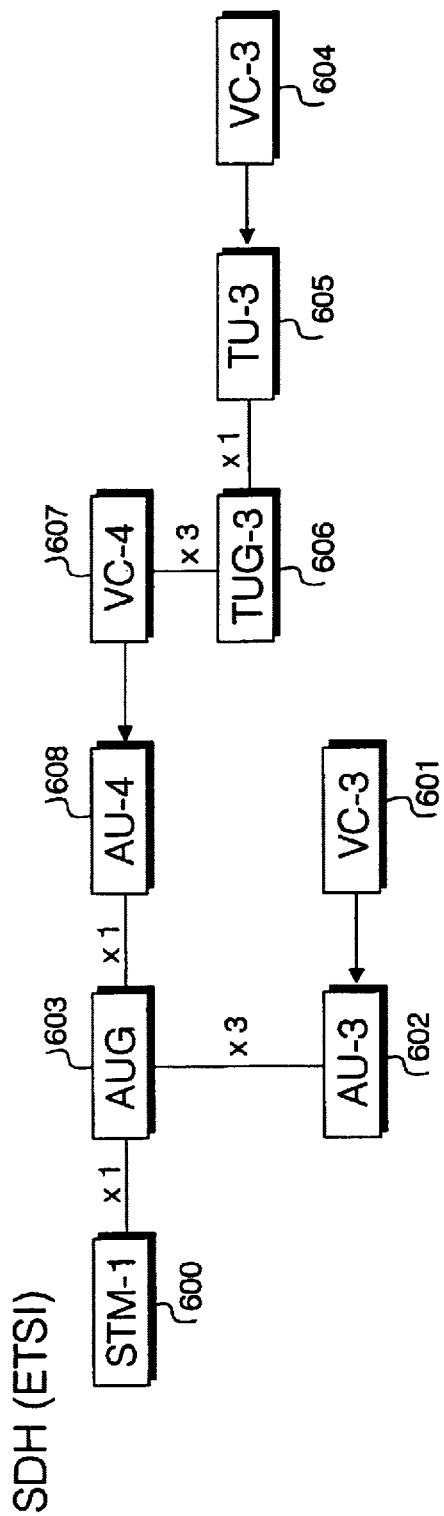
FIG. 6 illustrates schematically prior art ETSI derived options for multiplexing data from a VC-3 container stream to an STM-1 frame stream.

Referring to FIG. 6 herein, there is illustrated schematically a conventional prior art route for multiplexing a plurality of VC-3 container streams into an STM-1 frame using ETSI specific options within the synchronous digital hierarchy of FIG. 1. A stream of VC-3 virtual containers 601 can be incorporated into an STM-1 frame stream 600 either by creating three streams of AU-3 administrative units 601, which are combined into an administrative group stream 603, to which are added STM-1 section overhead bytes to form STM-1 frame stream 600, or a second VC-3 stream 604 may be converted to a TU-3 tributary unit stream 605 which is incorporated into a TUG-3 tributary unit group stream 606. Three such TUG-3 tributary unit group streams are combined into a VC-4 virtual container stream 607 which is incorporated into an AU-4 administrative unit stream 608, which is included in administrative unit group stream 603, in STM-1 frame stream 600.

Figure 7:
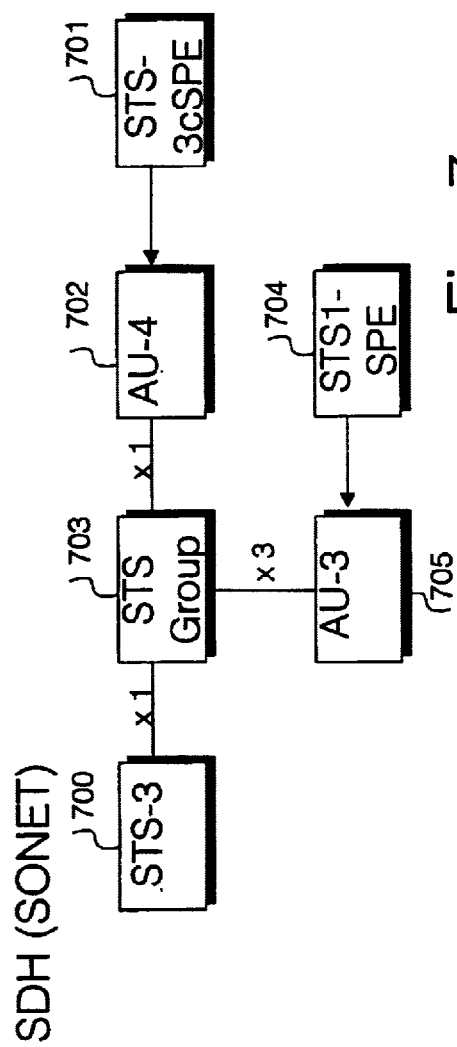
FIG. 7 illustrates schematically prior art options for multiplexing SONET STS-3C synchronous payload envelope streams to an STS-3 frame stream.

Referring to FIG. 7 herein, there is illustrated schematically conventional prior art options for multiplexing an STS-3C SPE stream 701 into an STS-3 frame stream 700, and a plurality of STS-1 SPE streams 704 into an STS-3 frame stream 700 using SONET specific options within SDH. STS-3C SPE stream 701 is incorporated into AU-4 administrative unit stream 702 and into STS group stream 703. STS group stream 703 is incorporated into an STS-3 frame stream 700. Alternatively, three STS-1 SPE streams 704 are each incorporated into a corresponding respective AU-3 administrative unit stream 705, the three AU-3 streams being combined into STS group stream 703, which is incorporated into STS-3 frame stream 700.

In the best mode implementations described herein, conversion between ETSI specific data rate options and SONET specific data rate options may occur at a granularity of data rates lower than is currently available in the prior art conversion between VC-4 containers and STS-3C synchronous payload envelopes at 139 MBits/s.

In particular, specific implementations of the present invention are concerned with:
  Translation between a VC-3 container stream and a STS-1 SPE (synchronous payload envelope) container stream;
  Mapping of VC-3 virtual containers into STM-1 frames.
  Mapping of VC-3 virtual containers into AU-3 administrative units.
  Mapping of VC-3 virtual containers into AU-4 administrative units.

Figure 8:
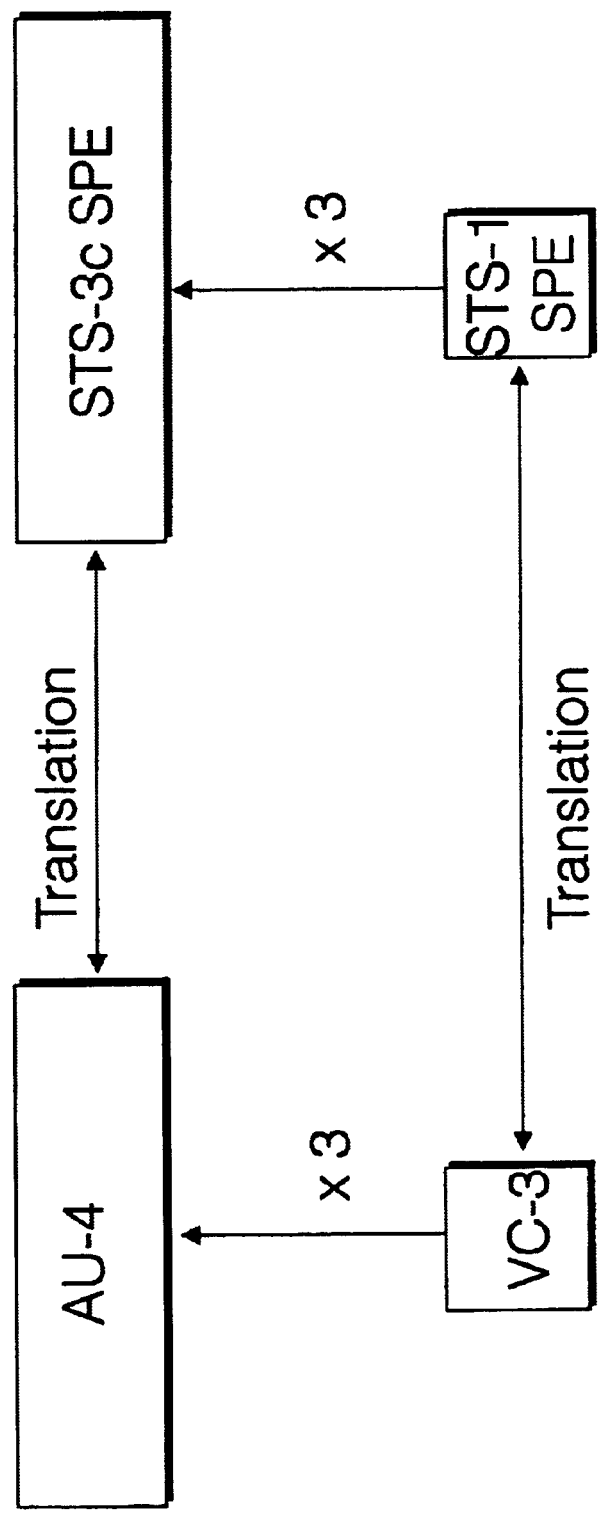
FIG. 8 illustrates schematically a comparison of ETSI derived AU-4 administrative units and VC-3 containers with SONET derived STS-3C synchronous payload envelope and STS-1 synchronous payload envelope equivalents within the synchronous digital hierarchy.

Translations of particular interest in the best mode herein are illustrated schematically in FIG. 8 herein. As illustrated schematically in FIG. 8 herein, a VC-3 virtual container has a same size (ie a same number of bytes) as a SONET STS-1 synchronous payload envelope (SPE). Similarly, a VCA virtual container is the same size as a SONET STS-3C synchronous payload envelope.

An AU-4 administrative unit may contain three VC-3 virtual containers. Similarly, an STS-3C SPE may contain three STS-1 SPEs.

Although a VC-3 container is equivalent in terms of number of bits contained to a SONET STS-1 synchronous payload envelope, because the structure of the VC-3 virtual container is different to the STS-1 SPE, direct mapping between these two equivalents is precluded in the prior art. Similarly, although an AU-4 administrative unit is a same size as a SONET STS-3C SPE, because of a difference in structure between the AU-4 administrative unit and the STS-3C SPE, direct mapping between these two approximately equivalent bit rate containers is also precluded in the prior art.

In the specific implementations of the present invention, by overcoming the structural differences and by translating data between VC-3 containers and STS-1 SPEs, there is taken advantage of the approximate equivalence of bit rates and container bit capacity between the two container types which may have an advantage of allowing translations which require a minimum amount of buffering, and incur a minimum amount of delay in conversion. Similarly, by overcoming structural differences between AU-4 administrative units and STS-3 SPEs, the equivalence of bit rate and container size between these two container types can be utilized to advantage.

Conversion of data between VC-3 containers and STS-1 SPEs has an additional advantage that the bit rate of the two container types is approximately equal to Ethernet bit rates of 50 MBits/s, making the size of VC-3 containers and STS-1 SPEs attractive for transport of frame based data over ETSI or SONET synchronous networks. Ethernet data frames at 50 MBits/s may be input into streams of VC-3 container payloads or streams of STS-1 SPEs payloads without excessive buffering, and translated between ETSI or SONET network types at the VC-3/STS-1 SPE level.

Figure 9:
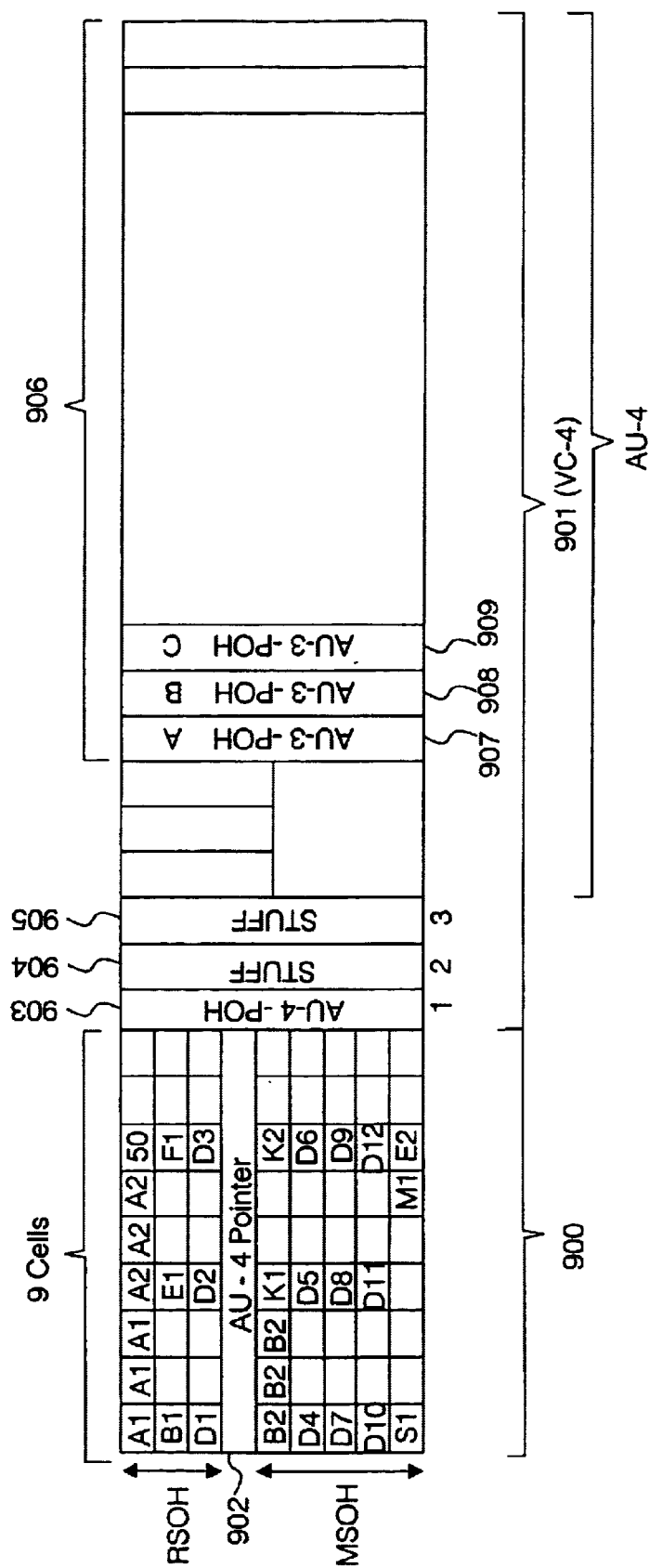
FIG. 9 illustrates schematically an STM-1 frame containing a VC-4 virtual container according to an ETSI option within the synchronous digital hierarchy, according to a specific implementation of the present invention.

Referring to FIG. 9 herein, there is illustrated schematically an STM-1 frame 600 comprising a 9 byte row×9 byte column overhead section 900 and a 9 byte row×261 byte column payload section containing a VC-4 virtual container 901. The start and finish of the VC-4 virtual container is identified in the overhead section 900 by bytes in a fourth row 902 of the section overhead. The VC-4 container payload 901 comprises a 9 byte VC-4 path overhead column 903; a pair of 9 byte stuffing columns 904, 905, a data payload 906 comprising 258 columns each of 9 bytes and filled with three AU-3 administrative units, each having a 9 byte column of AU-3 overhead 907, 908, 909 respectively; and the three pointers to the AU-3 administrative units are embedded within the 9 byte AU-4 pointer field 902 of the overhead section 900.

Figure 10:
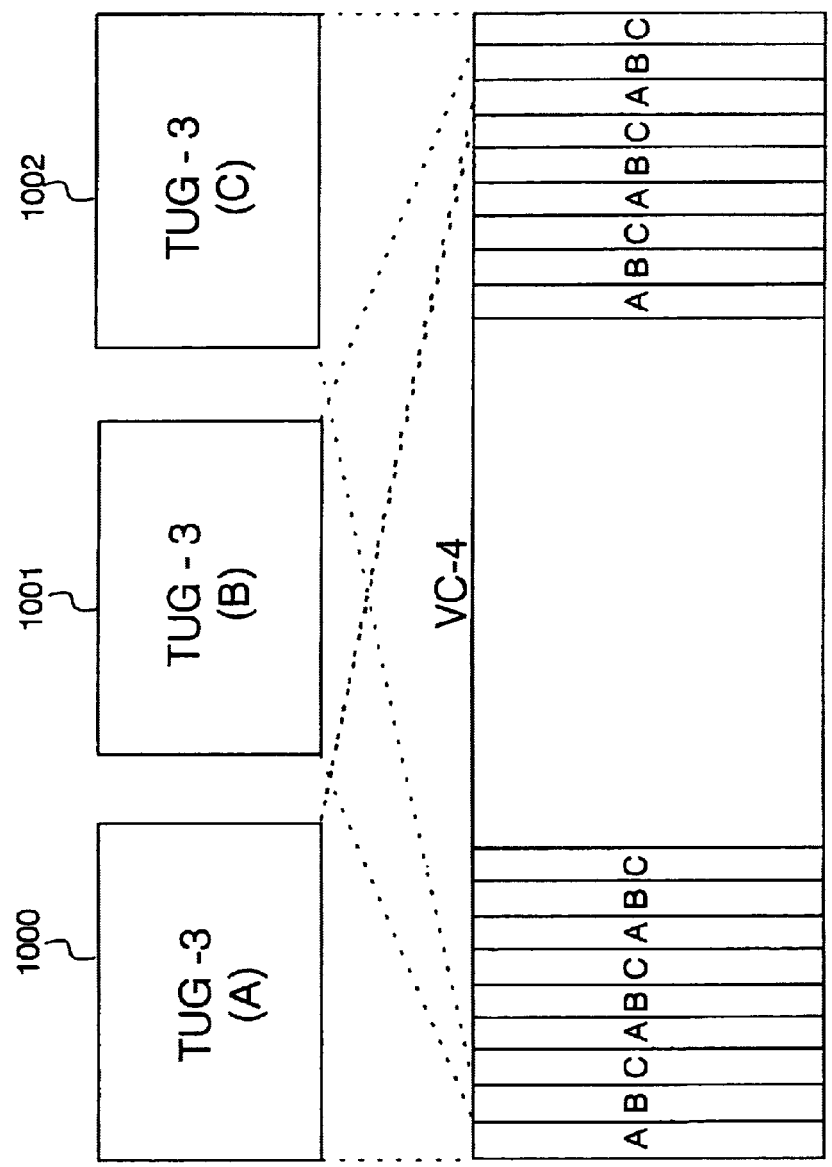
FIG. 10 illustrates schematically interleaving of three TUG-3 tributary unit groups within a single VC-4 container payload.

Referring to FIG. 10 herein, there is shown in more detail the content of VC-4 container 901. The arrangement of three TUG-3s as illustrated in FIG. 10 is sometimes called a TUG-4, although this entity has not been explicitly defined in ITU-T recommendation G.709. Byte columns of the three TUG-3 tributary unit groups, marked A, B, C are interleaved with each other as illustrated schematically in FIG. 10. The three interleaved TUG-3 tributary unit groups comprise three AU-3 administrative units, and three 9 byte columns, each containing 9 bytes of AU-3 packet overhead for a corresponding first, second or third administrative unit A, B or C as appropriate.

Referring to FIG. 10 herein, there is illustrated schematically interleaving of columns of first to third TUG-3 tributary unit groups A, B, C into a 9 bytes row×261 bytes column VC-4 virtual container. Each column of 9 bytes of each TUG-3 is interleaved with columns of the other TUG-3s within the VC-4 container. Whilst interleaving of 9 byte columns occurs between TUG-3s, during storage of the TUG-3s, when the container is transmitted, transmission is on a row by row basis.

By transmission in this manner, there is a greater likelihood of randomized of "0"s and "1"s along a transmission path.

Figure 11:
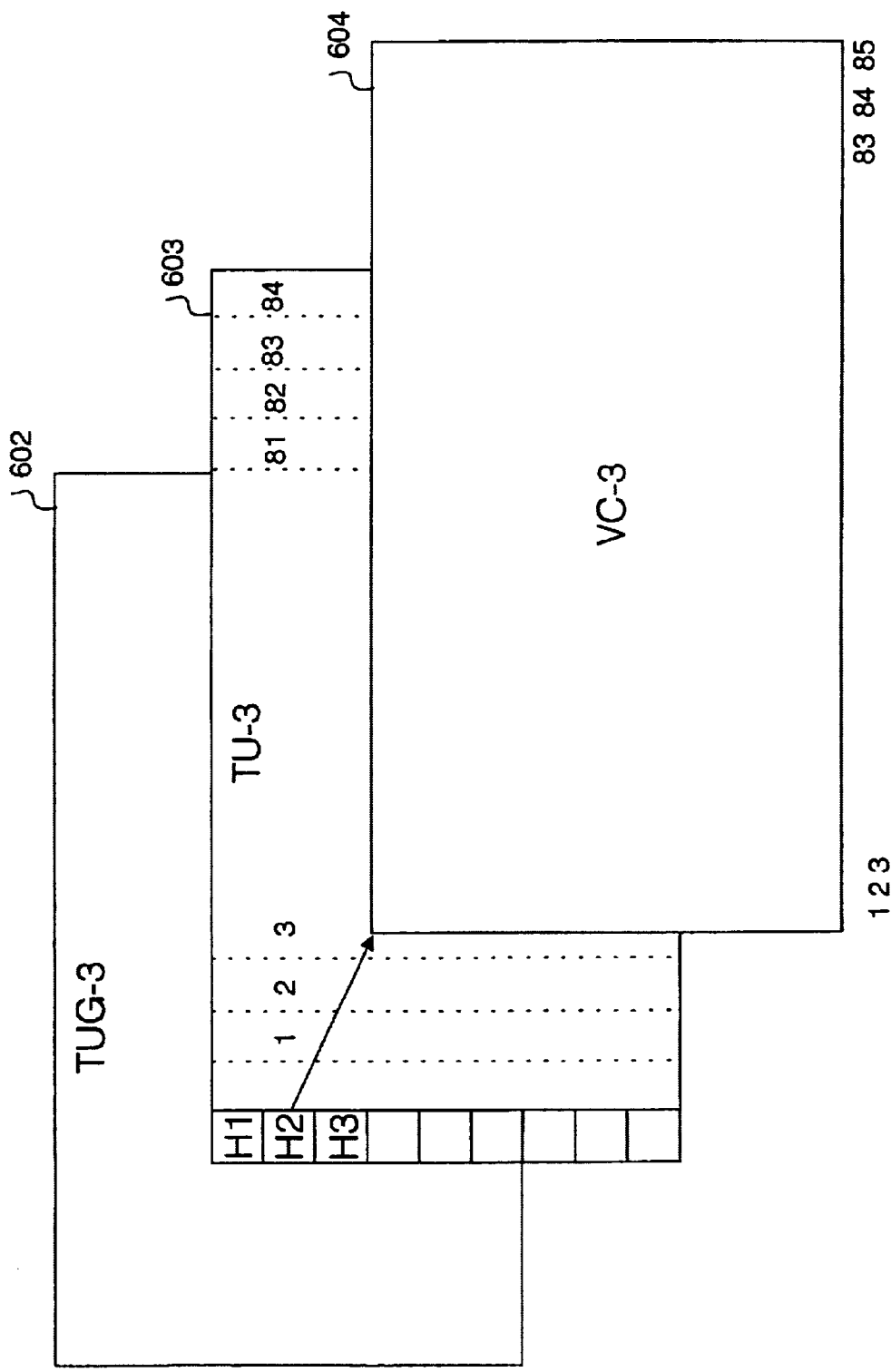
FIG. 11 illustrates schematically incorporation of a VC-3 virtual container within a TU-3 tributary unit, incorporated within a TU-3 tributary unit group.

Referring to FIG. 11 herein, each TUG-3 tributary unit group 602 comprises a TUG-3 tributary unit 603, which comprises a corresponding respective VC-3 container 604.

Figure 12:
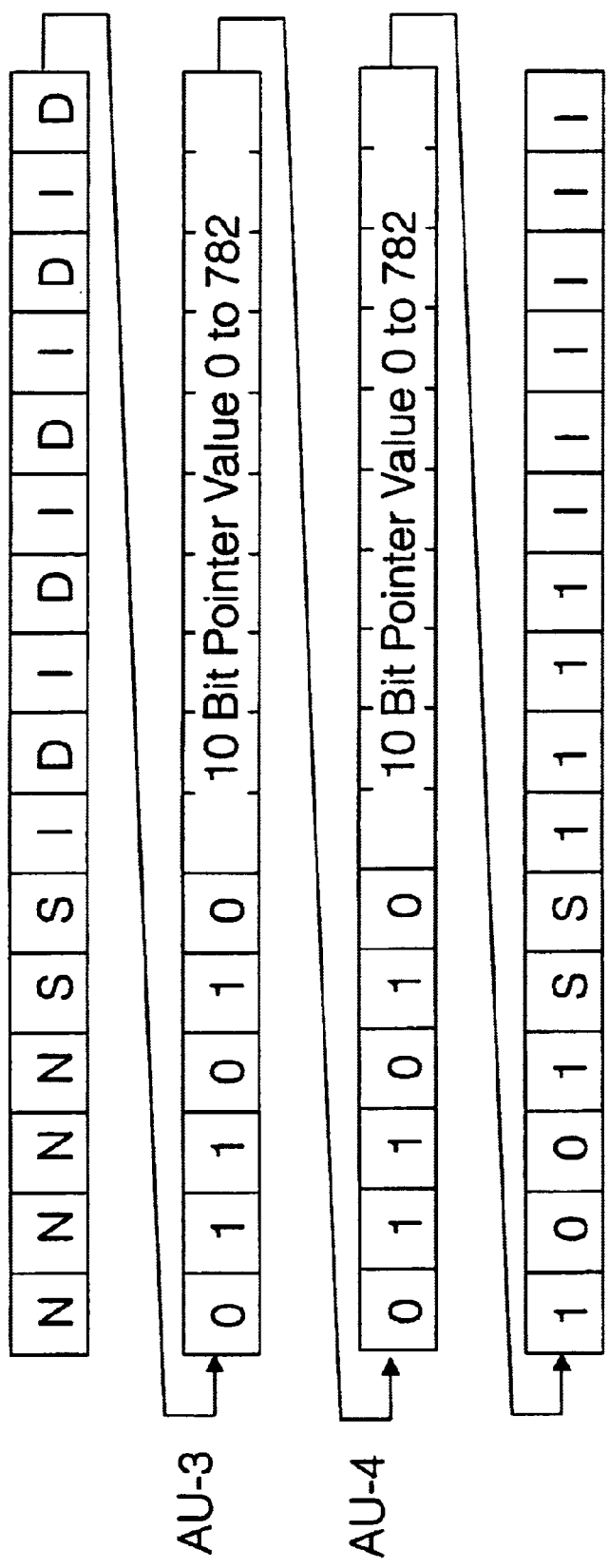
FIG. 12 illustrates schematically a set of pointer bytes within the STM-1 frame shown in FIG. 1 for pointing to three AU-3 administrative units within the VC-4 payload of FIG. 9.

Referring to FIG. 12 herein, there is illustrated in more detail the eight pointer bytes of the fourth row of the STM-1 frame section overhead, which point to the starts and ends of the AU-3 administrative units within the VC-4 payloads, The ninth byte is used as a negative justification opportunity.

Figure 13:
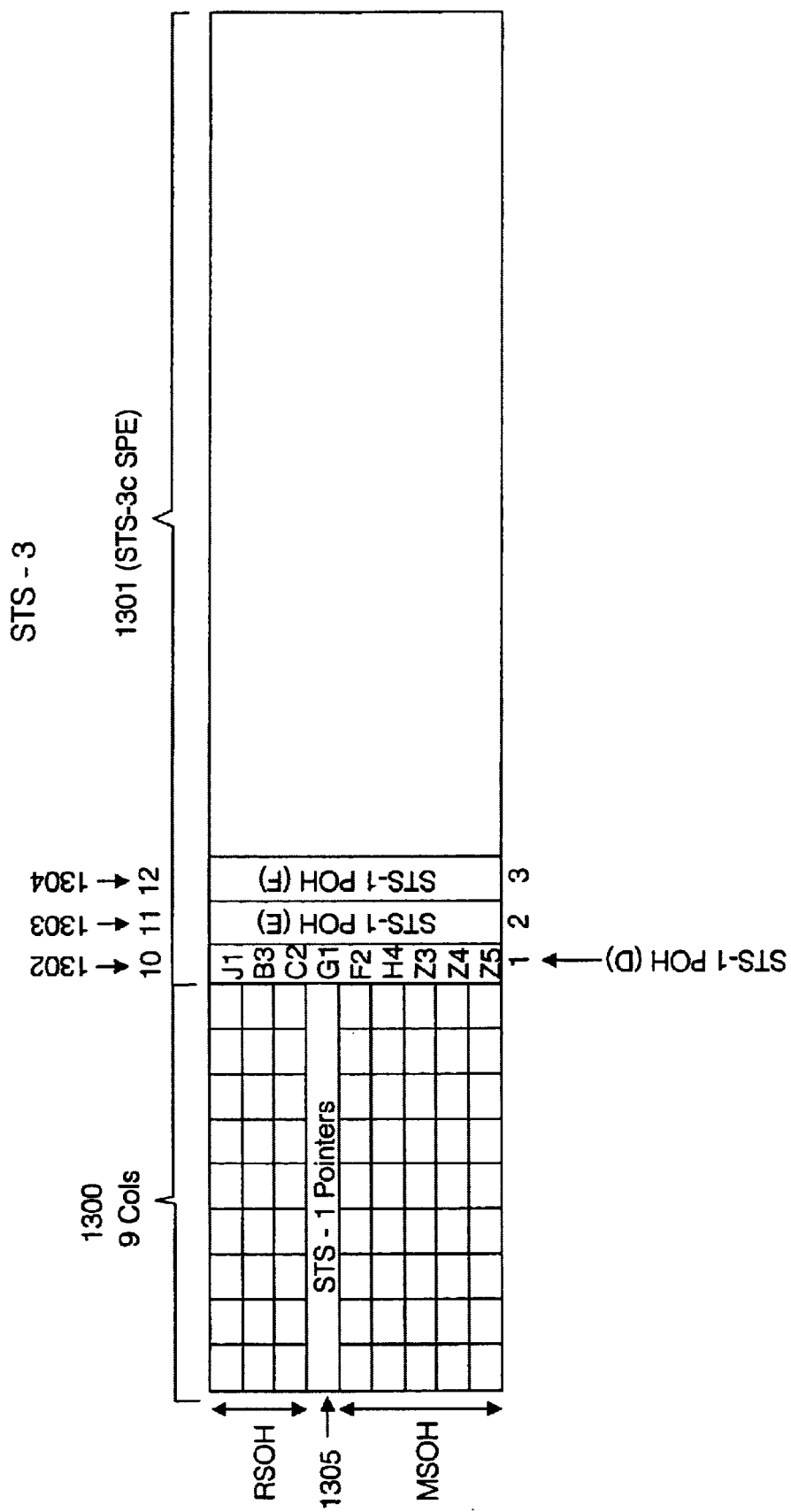
FIG. 13 illustrates schematically a SONET option STS-3C synchronous payload envelope incorporating a payload of three byte column interleaved STS-1 synchronous payload envelopes according to a specific implementation of the present invention.

Referring to FIG. 13 herein, there is illustrated an STS-3 frame containing an STS-3C synchronous payload envelope according to a specific implementation of the present invention. The SONET option STS-3 frame 1300 comprises a 9 byte row×9 byte column section overhead 1300 and a 9 byte row×261 byte column payload section 1301 containing the STS-3C synchronous payload envelope. The SPS-3C SPE 1301 comprises three STS-1 synchronous payload envelopes D, E, F.

Figure 14:
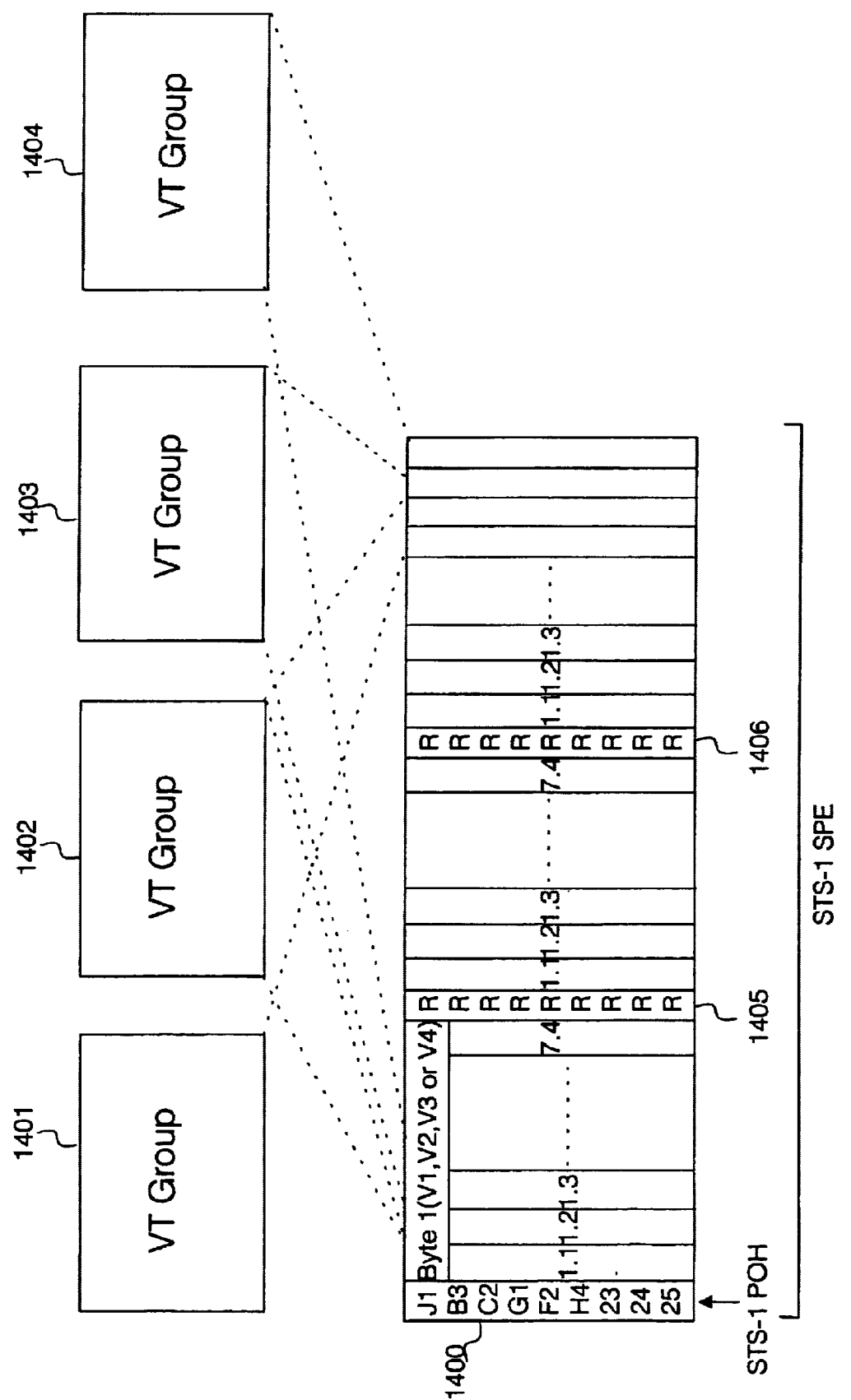
FIG. 14 illustrates schematically a layout of four VT Groups, each VT group having seven VT 1.5 virtual tributaries, giving a total of 28 VT 1.5 virtual tributaries interleaved within a single STS-1 synchronous payload envelope which correspond to the VT Group to STS-1 SPE mappings illustrated in FIG. 1 herein.

Referring to FIG. 14 herein, each STS-1 synchronous payload envelope comprises 783 bytes arranged into 9 rows and 87 columns. Each STS-1 SPE comprises a single column of 9 bytes STS-1 packet overhead 1400, first to fourth VT group data payloads 1401, 1402, 1403, 1404 respectively, each of 261 bytes arranged in 9 rows and 28 columns, and first and second redundant stuff byte columns 1405, 1406 each of 9 bytes which are positioned within the STS-1 SPE payload portion, interspersed with the interleaved byte columns of the four VT groups, and positioned between blocks of 28 column×9 row data bytes, such that the stuff byte columns appear spaced evenly at ⅓ and ⅔ intervals in the data payload of the STS-1 SPE, at $30^{th}$ and $59^{th}$ columns respectively.

Within STS-3C SPE payload section 1301 of the SONET STS-3 frame, individual columns of the three STS-1 SPEs are interleaved with each other in recurring sequence D, E, F, D, E, F, etc, so that the STS-3C SPE 1301 comprises a first three columns each of 9 bytes, comprising a first STS-1 SPE packet overhead (D) 1301, a second STS-1 SPE packet overhead (E) 1302, and a third STS-1 SPE packet overhead (F) 1303, followed by alternating interleaved columns each of 9 bytes, from the first, second and third STS-1 SPEs respectively in sequence D, E, F, D, E, F, D, E, F, etc. Thus, three sets of first and second redundant byte columns 1401, 1402 of the STS-1 SPEs appear within the STS-3C SPE payload section 1301. The start and end of each STS-1 payload within the STS-3 SPE payload section is indicated by a 1 byte row×9 byte column STS-1 pointer section within the STM-1 section overhead as shown in FIG. 12.

Figure 15:
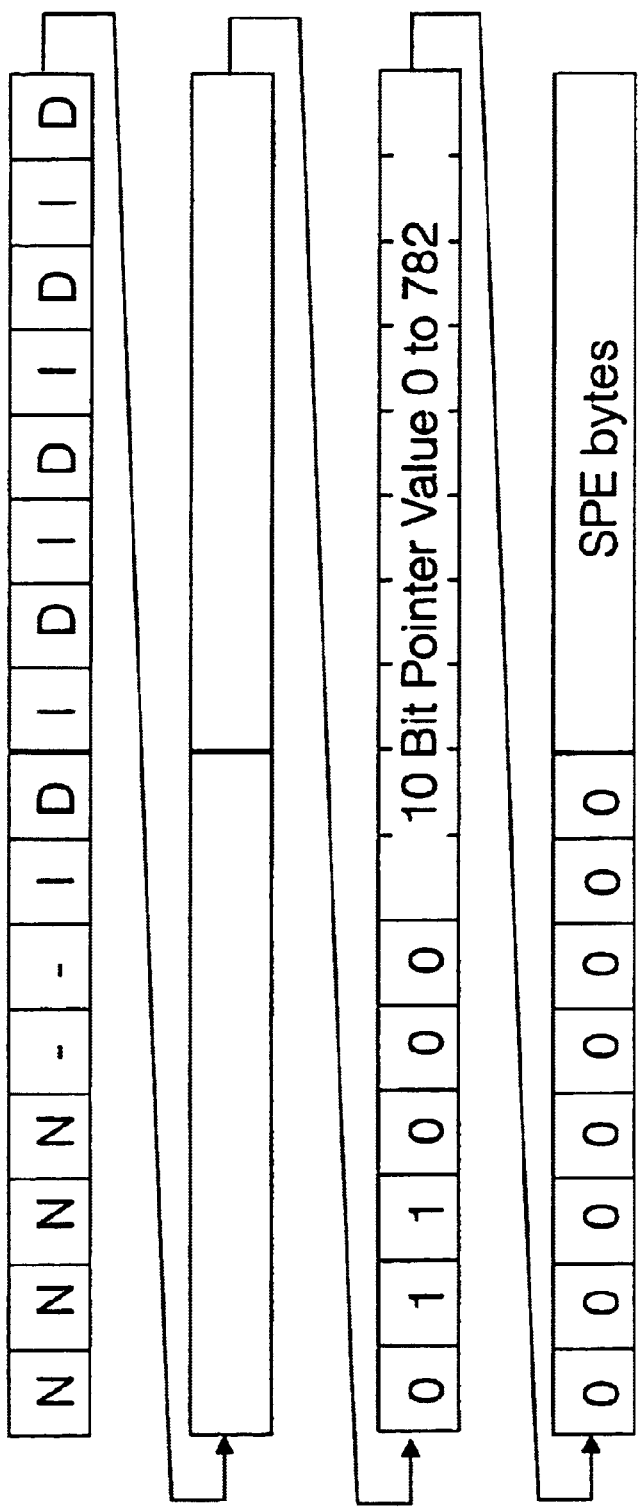
FIG. 15 illustrates schematically a set of pointer bytes within a fourth row of a 9 byte row×9 byte column STS-3 frame overhead.

Referring to FIG. 15 herein, there is illustrated schematically the pointers within the STS-1 frame which point to the starts and ends of the STS-1 SPEs within the STS-3C SPE.

The VC-4 payload 901 of the ESTI STM-1 frame and the STS-3C SPE payload 1301 of the SONET STM-1 frame have a same number of bytes as each other (9 rows×261 columns of bytes).

Comparing the ETSI option VC-4 payload 901 with the SONET option STS-3C SPE payload 1301, in each case there are a plurality of 9 byte columns of stuff bytes, which appear in different places within the payload as between the VC-4 payload and the STS-3C SPE payload. In the case of the VC-4 payload, the first and second stuff bytes appear at the second and third 9 byte columns of the VC-4, whereas in the STS-3C SPE, the corresponding first and second stuff byte columns 1304, 1305 of the first to third STS-1 SPEs appear at the $30^{th}$, $59^{th}$, $117^{th}$, $146^{th}$, $176^{th}$, $208^{th}$, $236^{th}$, 9 byte columns of the STS-3C SPE payload. Whilst the VC-4 has only two 9 byte columns of stuff bytes, the STS-3C SPE has six 9 byte columns of stuff bytes.

The starts and ends of the interleaved VC-3 containers appear at different places within a VC-4 payload, as compared with the starts and finishes of the STS-1 SPEs within the STS-3C SPE payload.

Specific implementations of the present invention perform a conversion between a VC-4 container and an STS-3C synchronous payload envelope, and reset the fourth row pointers within a 9 byte row×9 byte column STM-1 frame section overhead thereby translating an STM-1 ETSI frame to an STS-3 SONET frame equivalent. Consequently, a received STM-1 ETSI frame containing 3 TUG-3 tributary unit groups, after translation to an STS-3 frame can be demultiplexed to obtain the same data in the form of three STS-1 synchronous payload envelopes. Conversely, an STS-3 SONET frame, after translation to an STM-1 ETSI frame according to a specific method of the present invention can be de-multiplexed directly into three ETSI TUG-3 tributary unit groups, each containing a VC-3 container. Therefore, effectively by translation of an STM-1 ETSI frame to an STS-3 SONET frame and vice versa, substantially synchronous conversion between a VC-3 virtual container and an STS-1 synchronous payload envelope may be achieved.

Figure 16:
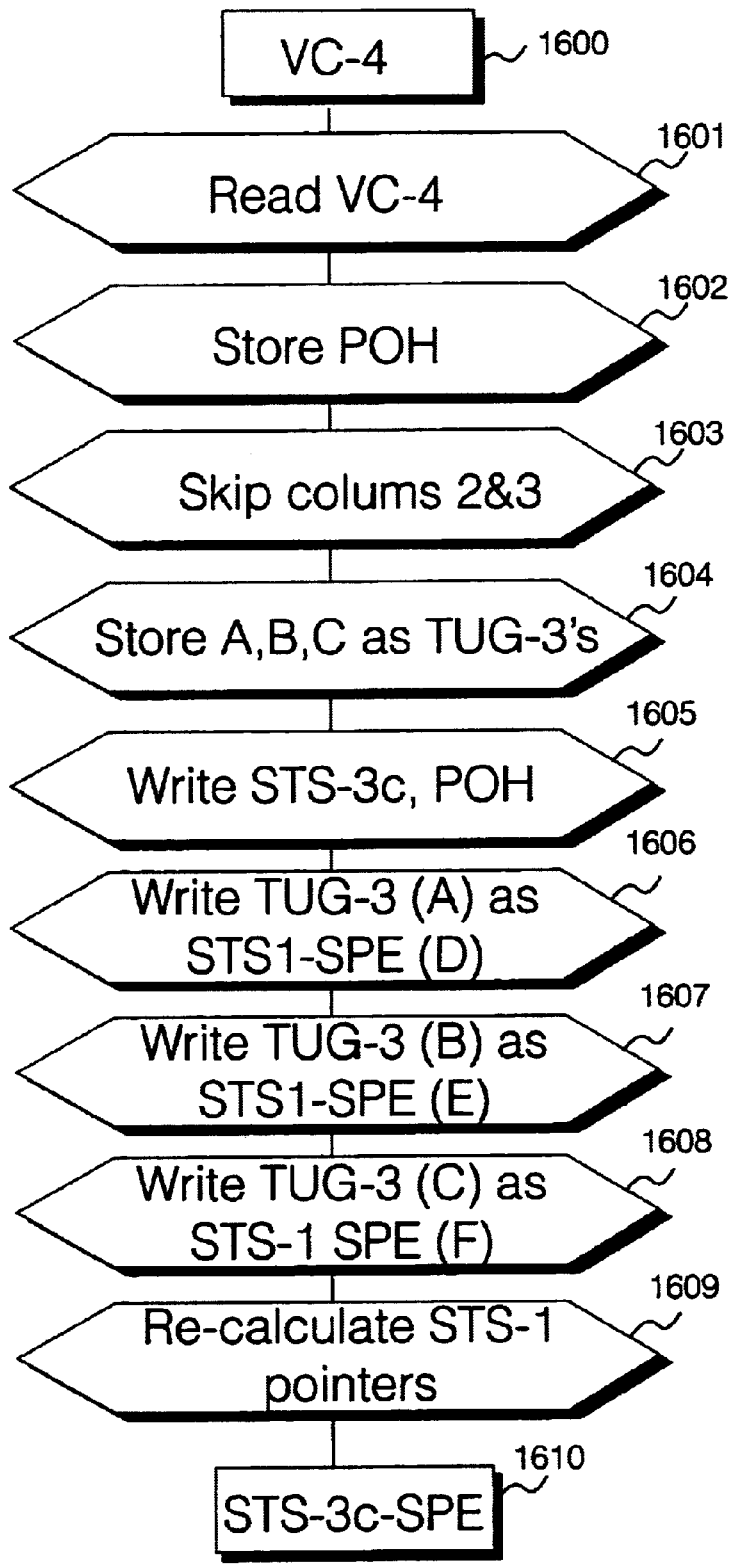
FIG. 16 illustrates schematically general process steps for conversion of payload data contained within a VC-4 virtual container to payload data contained within an STS-3C synchronous payload envelope according to a first specific method of the present invention.
Figure 17:
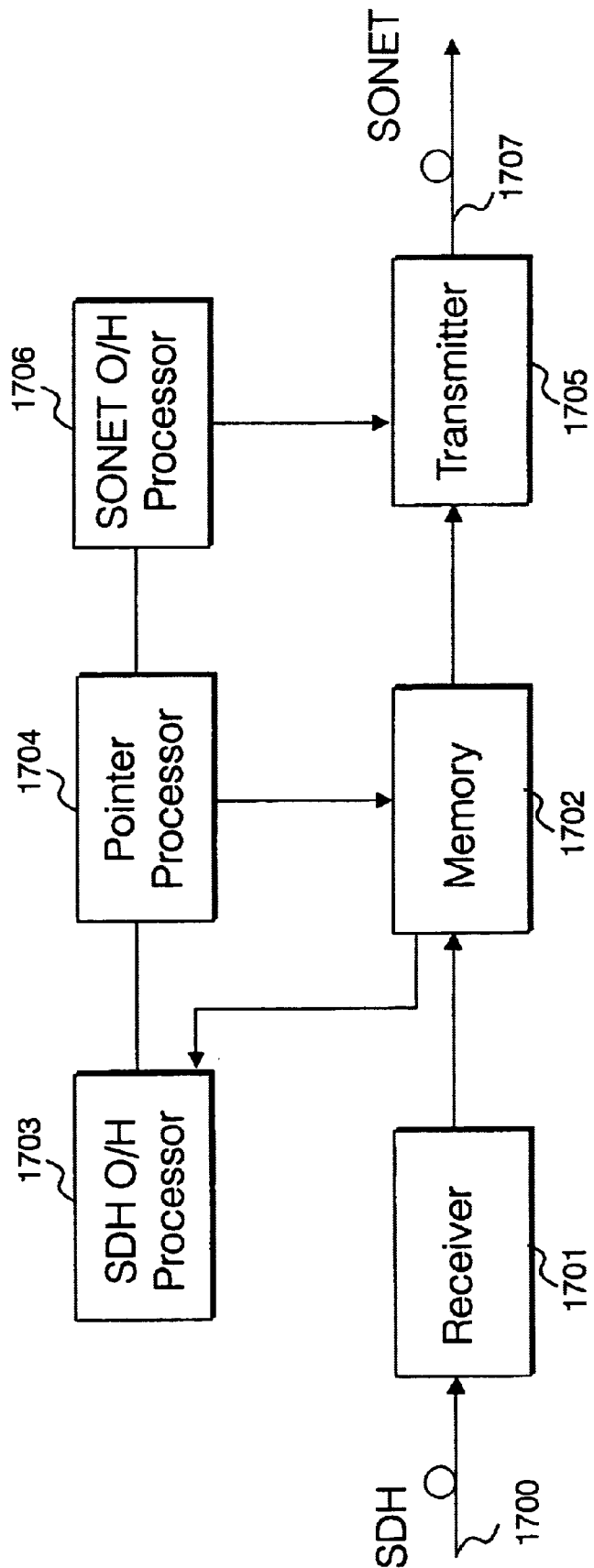
FIG. 17 illustrates schematically elements of a first conversion channel for converting payload data between a VC-4 virtual container stream, and an STS-3C synchronous payload envelope stream.

Referring to FIGS. 16 and 17 herein, there is illustrated schematically process steps for conversion of a VC-4 virtual container to an STS-3C synchronous payload envelope. It will be appreciated by those skilled in the art that a continuous stream of VC-4 containers are received and are converted to a continuous stream of STS-3 synchronous payload envelopes on an ongoing basis in real time. The process steps illustrated in FIG. 16 herein apply to each VC-4 virtual container which is translated to an STS-3C synchronous payload envelope. VC-4 container 1600 containing three VC-3 virtual containers is received for example over an SDH fiber link 1700 by receiver 1701. The VC-4 is received on a row by row basis, and is stored in buffer memory 1702 as a 9 byte column×261 byte row frame as illustrated schematically in FIG. 9 herein. In step 1602, the 9 byte AU-4 packet overhead 903 is stored. The AU-4 packet overhead bytes will be incorporated within the same column position within an STS-3C SPE to which the VC-4 is to be converted. The next two columns of the bytes of the VC-4, second and third columns 904, 905 respectively comprise stuff bytes, of which the values are not used. These two columns of bytes are ignored by overhead processor 1703, and are not stored in buffer memory 1702. The purpose of the second and third columns of stuff bytes is to pad the VC-4 out to the correct 9 byte×261 byte size for fitting into the next multiplex level up, ie the STM-1 frame. In step 1604, each of the first, second and third TUG-3s labeled A, B, C in FIG. 9 are stored in memory 1702 in interleaved manner. A complete 9 byte column of first TUG-3 (A) 1000 is written into memory, followed by a first 9 byte column of second TUG-3 (B) 1001, followed by a first 9 byte column of third TUG-3 (C) 1002, followed by a second 9 byte column of first TUG-3 (A) 1000, etc, until all columns of the first, second and third TUG-3s A, B, C respectively have been written in interleaved manner in a 9 byte column×255 byte array in memory 1702. The interleaved columns of data of the TUG-3s remain interleaved when converted into an STS-3C SPE payload. In step 1605, a 9 byte column STS-3C SPE packet overhead 1202 is written into a second data area in memory 1702 of 9 bytes×261 bytes, in which an STS-3 SPE is assembled. In step 1606, 1607 and 1608, the three TUG-3s A, B, C are written as three corresponding respective STS-1 SPEs D, E, F in the second memory area of memory 1702. In step 1609, a set of STS-1 pointers are calculated pointing to the positions within the STS-3C SPE at which the three STS-1 SPEs D, E, F commence. The resulting STS-3C SPE 1610 is output to transmitter 1705.

Meanwhile, the recalculated STS-1 pointers generated in pointer processor 1704 are input into SONET section overhead processor 1706 where they are included as 9 bytes along a fourth row of the 9 byte×9 byte SONET section overhead which is appended to the STS-3C SPE to form an STS-3 frame, which is output over fiber transmission line 1707.

Figure 18:
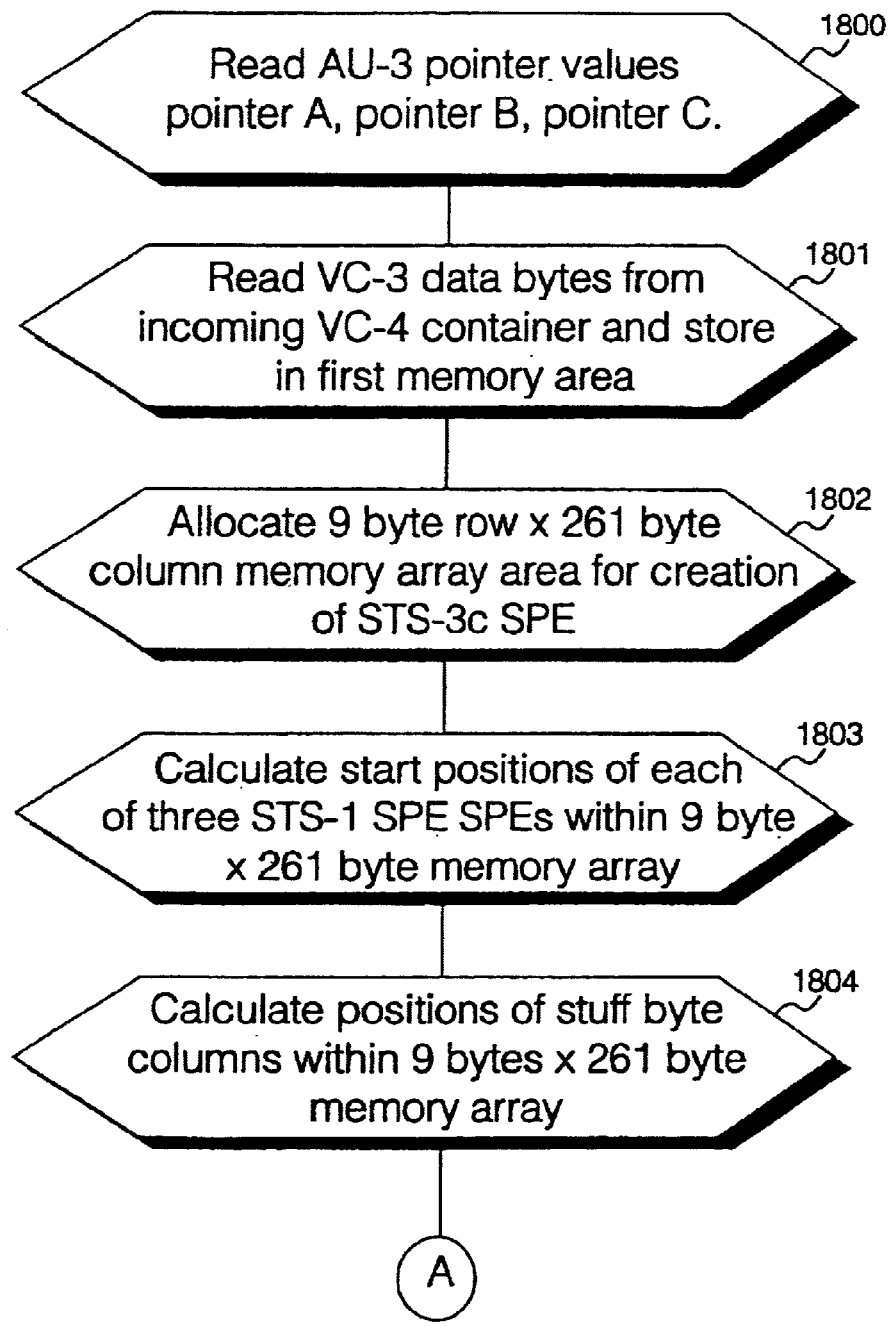
FIG. 18 illustrates schematically further process steps for conversion of payload data contained within a VC-4 virtual container to payload data contained within an STS-3 synchronous payload envelope.
Figure 18:
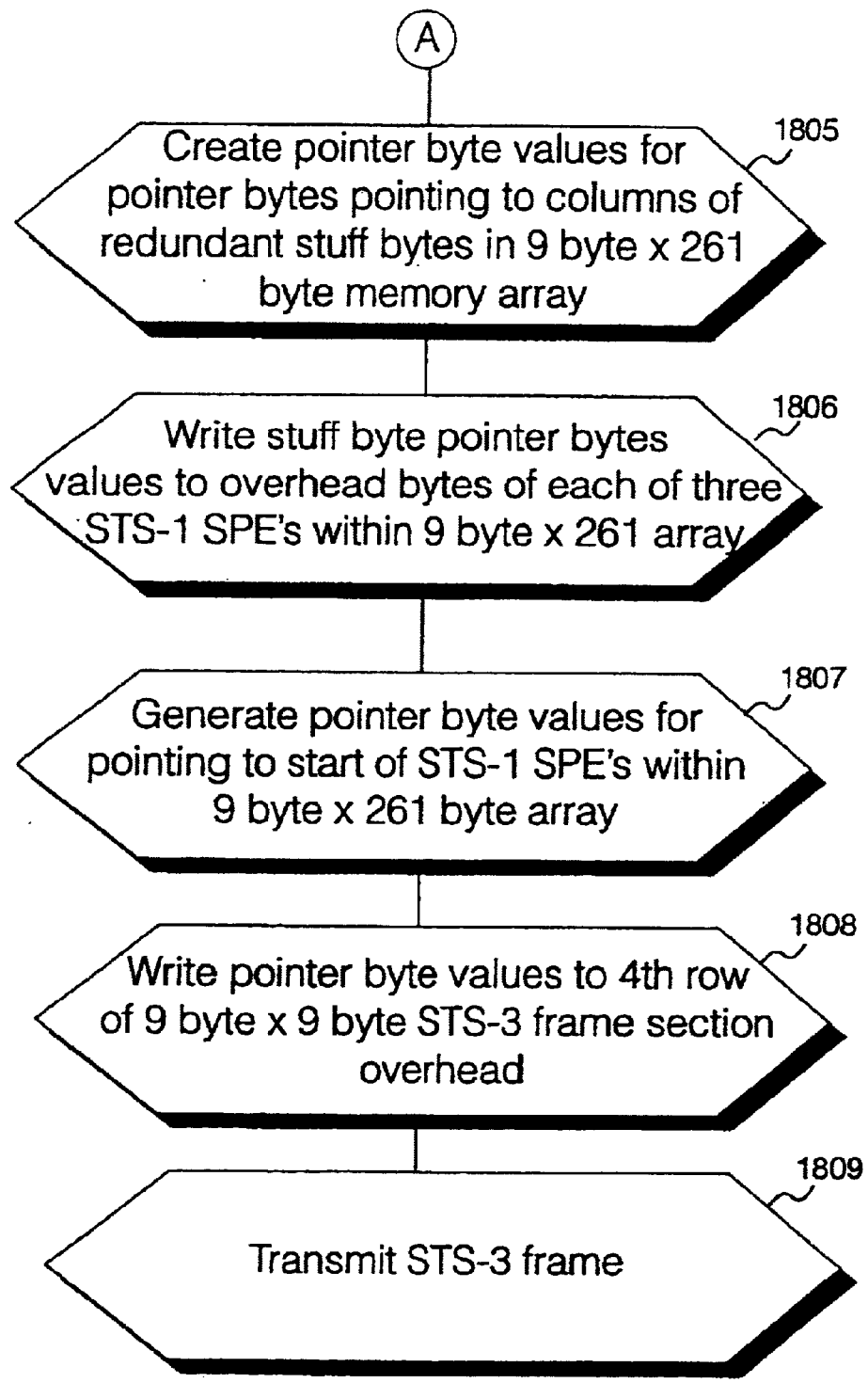

Referring to FIG. 18 herein, there is illustrated in more detail further process steps for converting a VC-4 virtual container containing three VC-3 virtual containers to an STS-3 SPE containing three STS-1 SPEs. After having stored the packet overhead in step 1602 and ignored first and second redundant byte columns 904, 905 in step 1603, in step 1800 a plurality of AU-3 administrative unit pointer values for pointing to first, second and third AU-3s (pointer A, pointer B, pointer C) are read in step 1800. In step 1801, a plurality of VC-3 data bytes are read from the incoming VC-4 container stored in the first memory area of memory device 1702. In step 1802, a 9 byte row×261 byte column area of memory 1702 is allocated for creation of an STS-1 3C SPE. Start positions of each of three STS-1 SPEs within the 9 byte×261 byte memory array is calculated in step 1803. In step 1804 the positions of stuff byte columns within the 9 byte×261 byte memory array, within the STS-1 SPE payload areas are calculated. Six such stuff byte columns per STS-3C SPE are provided in order to produce the correct amount of data within the 9 byte×261 byte array. In step 1805, pointer values for pointing to the columns of redundant stuff bytes within the 9 byte×261 byte memory array are calculated and are written as stuff byte pointers in overhead bytes of each of the STS-1 SPEs within the 9 byte×261 byte memory array in step 1806. The start positions of each of the STS-1 SPEs within the 9 byte×261 byte array are calculated, and written as pointer bytes within a fourth row of a 9 byte×9 byte STS-1 frame section overhead added by STS-3 section overhead processor 1706 prior to transmission of the completed 9 byte×261 byte array as an STS-3 frame in step 1809 by transmitter 1705.

Figure 19:
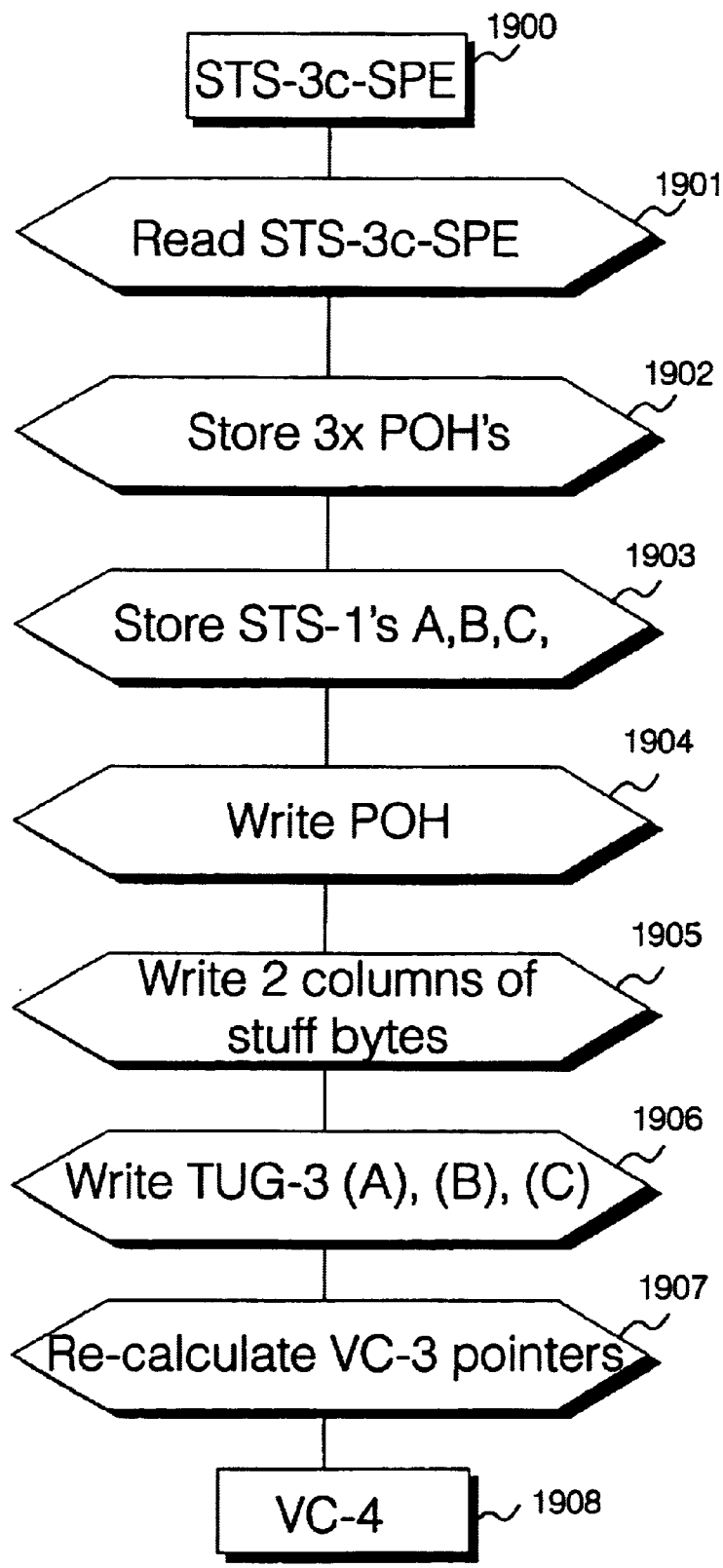
FIG. 19 illustrates schematically general process steps for converting payload data between an STS-3C synchronous payload envelope and a VC-4 virtual container according to a second specific method of the present invention.
Figure 20:
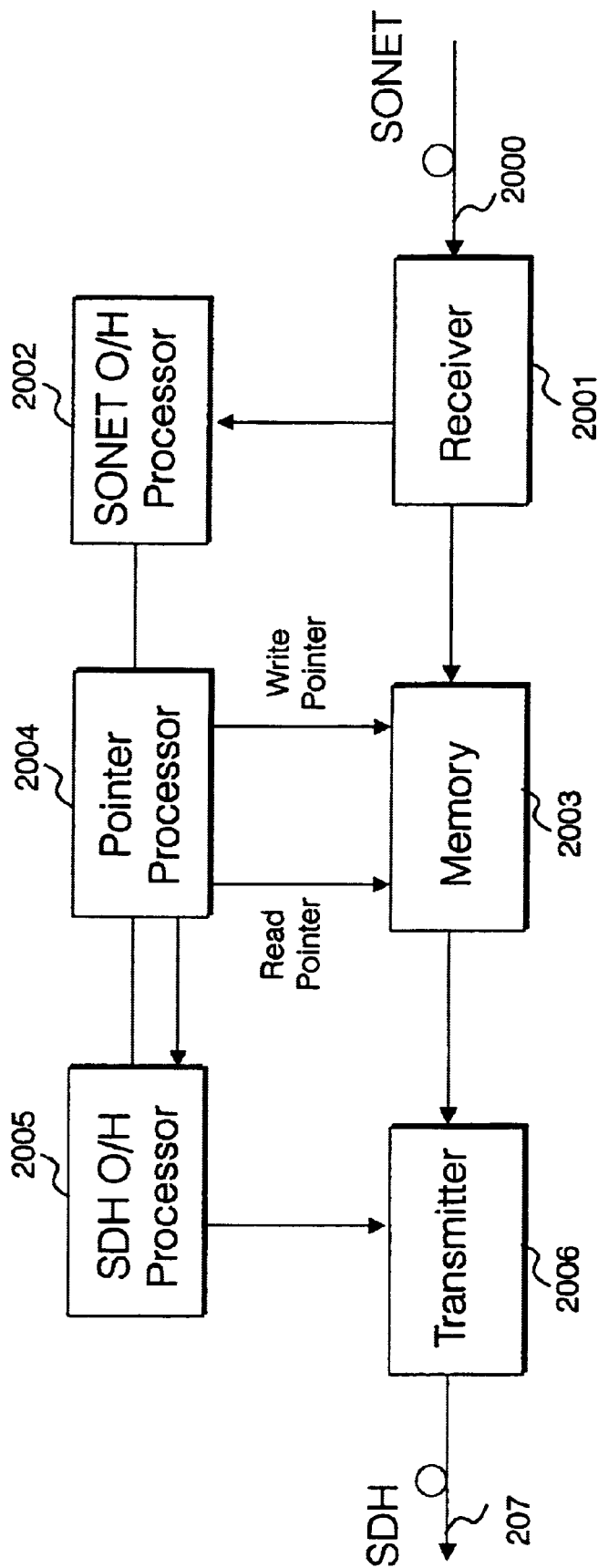
FIG. 20 illustrates schematically elements of a second conversion channel for converting data payloads between an STS-3 synchronous payload envelope stream and a VC-4 virtual container stream.

Referring to FIGS. 19 and 20 herein, there is illustrated schematically process steps for conversion of a received STS-3C synchronous payload envelope 1900 to a corresponding VC-4 virtual container 1908. An STS-3 frame is received over an incoming channel on fiber transmission line 2000 into synchronous receiver 2001. SONET overhead processor 2002 reads the 9 byte×9 byte STS-3 section overhead bytes and recovers the STS-1 pointers contained in the fourth row of the 9 byte×9 byte STS-3 section overhead 1300. In step 1001, the STS-3S SPE is written into a first memory area of buffer memory 2003. The STS-3C SPE comprises first to third STS-1 SPEs. In step 1902, the 9 byte packet overhead columns of each of these three STS-1 SPEs are stored and read by pointer process 2004. In step 1903, each of the STS-1 SPEs D, E, F are stored in first memory area of buffer memory 2003. Next, three TUG-3s are reconstructed, to form the basis of a VC-4 container by rewriting the three received STS-1 SPEs into a second memory area within buffer memory 2003, removing the columns of stuff bytes, 1405, 1406 from each STS-1 SPE, and adding first and second VC-4 9 byte stuff byte columns 1303, 1304 to the three rewritten STS-1 SPEs (hereinafter referred to as TUG-3s A, B, C). The STS-1 SPEs D, E, F are rewritten as columns 7 to 261 of a 9 byte×261 byte column array in the second memory area. Pointer processor 1404 calculates pointers to the start of the first, second and third TUG-3s A, B, C respectively and writes these to the fourth, fifth and sixth byte columns of the 9×261 array stored in the second memory area. In step 1905 columns 2 and 3 of the 9 byte×261 byte array are written with stuff bytes. The value of the stuff bytes may be random. An AU-4 packet overhead is written in the first column of a 9 byte×261 byte array in step 1904 to complete the STS-3 SPE containing first, second and third TUG-3s A, B, C which contain the same data as received in the first, second and third STS-1 SPEs D, E, F. The complete VC-4 container is transferred from memory 2003 to transmitter 2006, and to the VC-4 container is added an STM-1 section overhead from overhead processor 2005. Overhead processor 2005 receives from pointer processor 2004 pointer values which are incorporated into the AU-4 pointer in the fourth row of the 9 byte×9 byte section overhead which is added to the VC-4 container to create an STM-1 frame which is transmitted over a channel on fiber 2007.

Figure 21A:
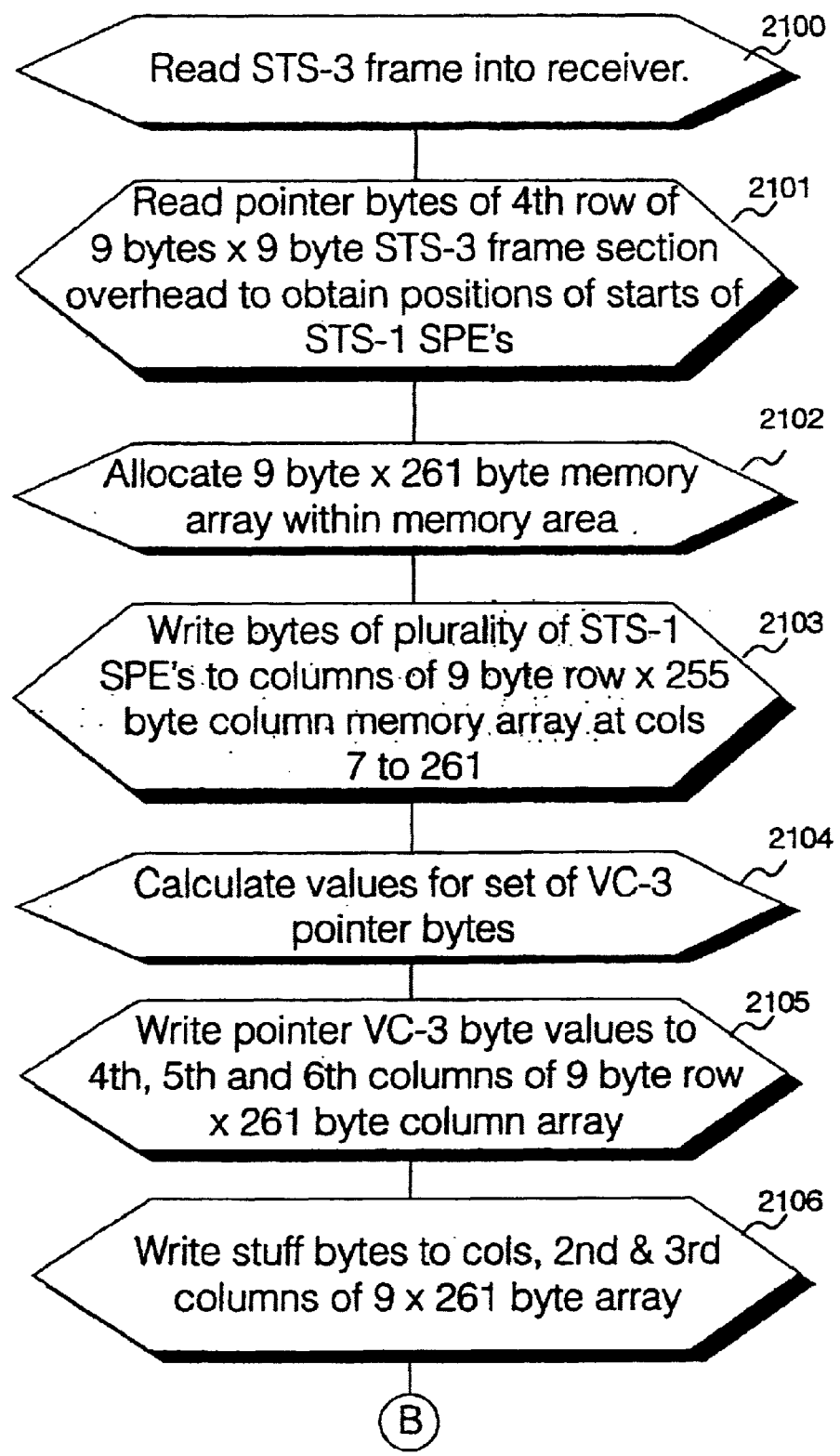
FIG. 21 illustrates schematically further process steps for converting payload data between an STS-3C synchronous payload envelope and a VC-4 virtual container.
Figure 21:
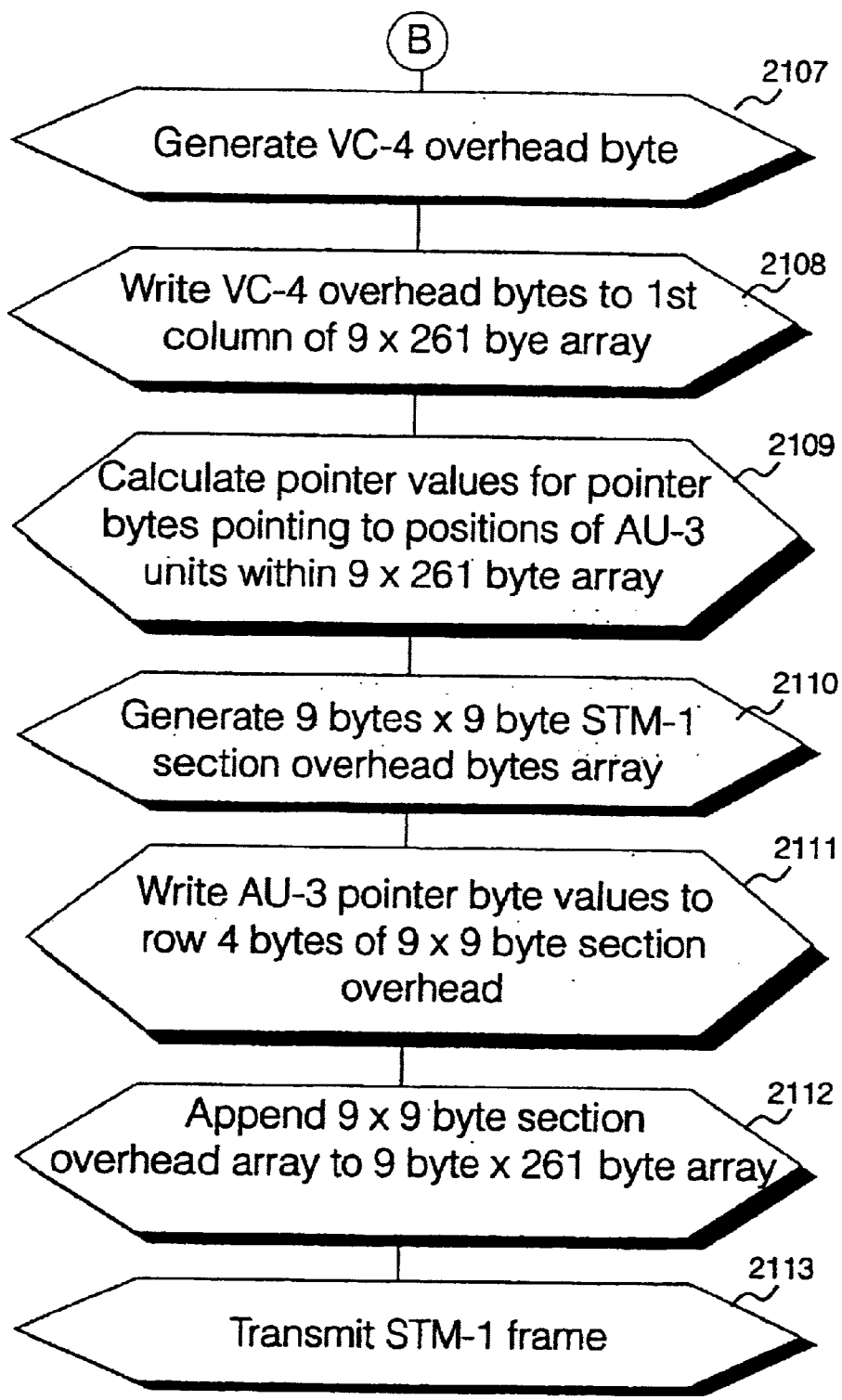

Referring to FIG. 21 herein, there are illustrated further processing steps for conversion of an STS-3C SPE received in an STS-3 frame to a VC-4 container transmitted in an STM-1 frame. In step 2100 the STS-3 frame is read into receiver 1901. STS-3 overhead processor 1902 reads the pointer bytes from the fourth row of the 9 byte×9 byte STS-3 frame section overhead to obtain positions of the STS-1 SPEs within the STS-3 frame in step 2101. A 9 byte×261 byte memory array area of memory device 1903 is allocated for receipt of data bytes of three STS-1 synchronous payload envelopes which are written to the 9 byte×261 byte memory array at columns 6 to 261 in step 2103. These positions within the memory array correspond to the positions at which VC-3 container data would be written within a VC-4 container which can be stored within a memory array of a same size. In step 2104 values are calculated for a set of VC-3 pointer bytes which point to the start of three VC-3s within the 9 byte×261 byte memory array. Bytes of the three STS-1 SPEs are written in an interleaved manner, a first column of first STS-1 SPE being written at the seventh column of the array, a first column of the second STS-1 SPE being written at the eighth column of the array, and a first column of the third STS-1 SPE being written at the ninth column of the array. Similarly for the second, third, etc columns of the first, second and third STS-1 SPEs. In step 2105 the VC-3 pointer byte values are written to the fourth, fifth and sixth columns of the 9 byte×261 byte column array. The VC-3 pointer bytes do not completely fill the fourth, fifth and sixth columns of the array. In step 2106 redundant stuff bytes are written to the second and third columns of the array and in steps 2107 and 2108 a set of VC-4 overhead bytes are generated by SDH (ETSI) processor 1905 and written to the array at the first column in step 2108. Pointer values for pointing to the positions of the AU-3 administrative units within the 9 byte×261 byte array are calculated in step 2109 and incorporated into 9 byte×9 byte STM-1 section overhead array generated in step 2110 by overhead processor 1905. The 9 byte×9 byte section overhead array is appended to the 9 byte×261 byte array containing the VC-4 in step 2112 at transmitter 1907, which then transmits the STM-1 frame in step 2118. It will be appreciated by those skilled in the art that the above process illustrates processing of a single STS-3 frame and conversion into a single STM-1 frame with reference to FIGS. 19 to 21 herein. In practice a plurality of frames are processed in parallel and a plurality of 9 byte×261 byte memory arrays are allocated for processing continuously and either in parallel or serially a stream of STS-3 frames.

What is claimed is:

1. A method of converting payload data between a VC-3 virtual container and an STS-1 synchronous payload envelope, said method comprising the steps of:

reading a first set of pointer bytes, said first set of pointer bytes pointing to a position within said VC-4 virtual container of each of a plurality of VC-3 virtual containers;

reading bytes of first, second and third VC-3 virtual containers from positions within said VC-4 virtual container indicated by said first set of pointer bytes;

generating an STS-3C synchronous payload envelope;

determining start positions within an STS-3C synchronous payload envelope of each of a plurality of STS-1 synchronous payload envelopes;

determining positions within said STS-1 synchronous payload envelopes of each of a plurality of redundant stuff bytes;

determining a set of STS-1 synchronous payload envelopes pointer byte values for pointing to said start positions of said plurality of STS-1 synchronous payload envelopes within said STS-3C synchronous payload envelopes;

determining a set of pointer byte values for pointing to said positions of said redundant stuff bytes within said STS-1 synchronous payload envelopes; and writing said bytes of said first, second and third VC-3 virtual containers into positions within said STS-3C synchronous payload envelopes allocated for said plurality of said STS-1 SPEs, wherein said step of determining positions within an STS-1 synchronous payload envelope of each of a plurality of redundant stuff bytes comprises:

writing a said STS-1 synchronous payload envelope as a 9 byte row×87 byte column array; and setting said plurality of redundant stuff bytes as occupying a $30^{th}$ said column of bytes and a $59^{th}$ said column of bytes.

2. The method as claimed in claim 1, further comprising the steps of:

reading a second set of pointer bytes, said second set of pointer bytes indicating a start of said VC-4 virtual container within an STM-1 frame.

3. The method as claimed in claim 1, wherein said step of determining a set of pointer byte values for pointing to said positions of said redundant stuff bytes within a said STS-1 synchronous payload envelope comprises:

writing said STS-1 synchronous payload envelope as a 9 byte row×87 byte column array, and setting said pointer byte values to point to a first byte of a $30^{th}$ said column and to a first byte of a $59^{th}$ said column.

4. The method as claimed in claim 1, wherein said step of determining start positions within the STS-3C synchronous payload envelope of each of a plurality of STS-1 synchronous payload envelopes comprises the steps of:

allocating a memory area for storing an array of 9 rows of bytes×261 columns of bytes; and setting said start positions of said plurality of said STS-1 synchronous payload envelopes as being at a first byte of a first said column, a first byte of a second said column and a first byte of a third said column.

5. The method as claimed in claim 1, wherein said step of writing bytes of said first, second and third VC-3 virtual containers into STS-3C synchronous payload envelopes comprises:

writing each of a plurality of columns of a said VC-3 container to a corresponding respective column in a 9 byte×261 byte memory array comprising a said STS-3C synchronous payload envelope.

6. The method as claimed in claim 1, wherein a said step of writing bytes of said first, second and third VC-3 virtual containers into positions allocated for said SPS-1 synchronous payload envelopes comprises the steps of:

writing a plurality of columns of said VC-3 virtual containers into columns of a 9 byte row×261 byte column memory array, at positions of the $1^{st}$ to $29^{th}$ byte columns, the $31^{st}$ to $58^{th}$ byte columns, $60^{th}$ to $87^{th}$ byte columns, $89^{th}$ to $116^{th}$ byte columns, $118^{th}$ to $146^{th}$ byte columns, $147^{th}$ to $175^{th}$ byte columns, $178^{th}$ to $204^{th}$ byte columns, $209^{th}$ to $235^{th}$ byte columns and $234^{th}$ to $261^{th}$ byte columns.

7. The method as claimed in claim 1, comprising the step of:
  reading an STM-1 frame containing a said VC-4 virtual container;
  reading a third set of pointer bytes from a section overhead of said STM-1 frame, said third set of pointer bytes indicating a start position of said VC-4 virtual container within STM-1 frame.

8. Apparatus for converting payload data between a VC-3 virtual container and an STS-1 synchronous payload envelope, said apparatus comprising:
  pointer processing means capable of reading a first set of pointer bytes, said first set of pointer bytes pointing to a position within said VC-4 virtual container of each of a plurality of VC-3 virtual containers;
  memory means arranged for storing first, secondhand third read VC-3 virtual containers from positions within said VC-4 virtual container indicated by said first set of pointer bytes;
  pointer processing means capable of determining start positions within an STS-3C synchronous payload envelope of a plurality of STS-1 synchronous payload envelopes;
  pointer processing means capable of determining positions within said STS-1 synchronous payload envelopes of a plurality of redundant stuff bytes;
  pointer processing means capable of determining a set of pointer byte values for pointing to said start positions of said STS-1 synchronous payload envelopes within said STS-3C synchronous payload envelopes;
  pointer processing means capable of determining a set of pointer byte values for pointing to said positions of said redundant stuff bytes within said STS-1 synchronous payload envelopes; and
  memory means arranged for storing said VC-3 virtual container payload data in a memory area allocated for said: STS-3C synchronous payload envelope at memory positions corresponding to said plurality of said STS-1 SPEs within said STS-3C SPE, wherein
    said pointer processing means determine positions within an SIS-1 synchronous payload envelope of each of a plurality of redundant stuff bytes, wherein a said STS-1 synchronous payload envelope is written as a 9 byte row×87 byte column array; and
    said plurality of redundant stuff bytes are set as occupying a $30^{th}$ said column of bytes and a $59^{th}$ said column of bytes.

9. The apparatus as claimed in claim 8, further comprising receiver means capable of receiving a VCA virtual container stream.

10. The apparatus as claimed in claim 8, further comprising transmitter means for transmitting a stream of STS-3C synchronous payload envelopes.

11. A method of converting payload data between a VC-3 virtual container and an STS-1 synchronous payload envelope, said method comprising the steps of:
  reading an STS-3C synchronous payload envelope, said STS-3C synchronous payload envelope containing a plurality of STS-1 synchronous payload envelopes;
  generating a VC-4 virtual container;
  writing said plurality of STS-1 synchronous payload envelopes to said VC-4 virtual container;
  determining values for a plurality of VC-3 virtual container pointers for identifying positions of said VC-3 containers within said VC-4;
  writing said VC-3 pointer values as VC-3 pointer bytes within said VC-4 container; and
  writing a plurality of stuff bytes to said VC-4 container.

12. The method as claimed in claim 11, further comprising the step of removing redundant stuff bytes from said plurality of STS-1 synchronous payload envelopes prior to said step of writing said plurality of STS-1 synchronous payload envelopes to said VC-4 container.

13. The method as claimed in claim 11, wherein said plurality of STS-1 synchronous payload envelopes are written to said VC-4 container as a plurality of byte columns, first, second and third said STS-1 synchronous payload envelopes each comprising a plurality of said byte columns, said plurality of STS-1 synchronous payload envelopes being written to said VC-4 container such that said byte columns of said first, second and third STS-1 synchronous payload envelopes are interleaved with each other within said VC-4 container.

14. The method as claimed in claim 11, wherein said step of determining values of said VC-3 pointers comprises:
  setting a first pointer value to refer to a position in a 9 byte row×261 byte column array at a first row and seventh column of said array;
  setting a second pointer value to point to a position in said 9 byte row×261 byte column array at a first row and eighth column of said array; and
  setting a third pointer value to point to a position in said 9 byte row×261 byte column array at a first row and ninth column of said array.

15. The method as claimed in claim 11, further comprising the step of receiving an STS-3 frame containing said STS-3C synchronous payload envelope; and
  reading a set of pointers indicating start positions of said plurality of STS-1 synchronous payload envelopes within said STS-3C synchronous payload envelope.

16. The method as claimed in claim 11, further comprising the steps of:
  receiving an STS-3 frame containing an STS-3C synchronous payload envelope; and
  reading a set of pointers within a section overhead of said STS-3 frame, said pointers indicating a start position of said STS-3 synchronous payload envelope within said STS-3 frame.

17. Apparatus for converting payload data between a VC-3 virtual container and an STS-1 synchronous payload envelope, said apparatus comprising:
  receiver means for receiving an STS-3C synchronous payload envelope, said STS-3C synchronous payload envelope containing a plurality of STS-1 synchronous payload envelopes;
  memory means arranged for storing said plurality of STS-1 synchronous payload envelopes received by said receiver means within a memory area arranged to store a VC-4 container;
  pointer processing means capable of generating VC-3 virtual container pointer bytes, and writing said VC-3 pointer bytes within said memory area allocated to said VC-4 container; and
  pointer processing means capable of generating a set of VC-4 overhead bytes and writing said overhead bytes to said memory area allocated for storing said VC-4 container.

18. The apparatus as claimed in claim 17, wherein said memory area arranged to store a VC-4 container comprises a 9 byte row×261 byte column memory array.

19. The apparatus as claimed in claim 17, further comprising transmitter means for transmitting an STS-3 frame containing the contents of a VC-4 virtual container.

20. The apparatus as claimed in claim 17, further comprising:

STM-1 frame section overhead processor means capable of generating a set of STM-1 frame section overhead bytes, said STM-1 frame overhead processor receiving a set of AU-4 pointer bytes from said pointer processor means, wherein said STM-1 frame overhead processor means operates to incorporate said AU-4 pointer bytes within an STM-1 section overhead.

21. A method of synchronously converting data between a plurality of VC-3 container streams and a plurality of STS-1 synchronous payload envelope streams, said method comprising the steps of:

receiving a VCA container stream containing said plurality of VC-3 container streams;

identifying each said VC-3 container stream within said VC-4 container stream and reading each said VC-3 container stream;

adding redundant stuff bytes to each said VC-3 container stream; and writing said plurality of VC-3 container streams to a stream of 9 byte column×261 byte row STS-3C synchronous payload envelopes.

22. The method as claimed in claim 21, further comprising writing said stream of STS-3C synchronous payload envelopes to a stream of STS-3 frames.

23. The method as claimed in claim 21, wherein said step of writing said STS-3C synchronous payload envelope stream to said STS-3 frame stream comprises:

for each STS-3 frame, determining a pointer value indicating a start position of a said STS-3C synchronous payload envelope within said STS-3 frame.

24. The method as claimed in claim 21, wherein said step of writing said stream of STS-3C synchronous payload envelopes to said stream of STS-3 frames comprises:

determining a set of pointer values indicating a start position of a plurality of STS-1 synchronous payload envelopes, within each said STS-3 synchronous payload envelope of said STS-3C synchronous payload envelope stream.

25. A method of synchronously converting a stream of STS-1 synchronous payload envelopes to a stream of VC-3 virtual containers, said method comprising the steps of:

reading a stream of STS-3C synchronous payload envelopes, said STS-3 synchronous payload envelope stream containing a plurality of streams of said STS-1 synchronous payload envelopes;

for each STS-3 synchronous payload envelope, identifying a start position of each of a plurality of STS-1 synchronous payload envelopes contained within said STS-3C synchronous payload envelope;

for each STS-1 synchronous payload envelope, removing a plurality of redundant stuff bytes;

writing said plurality of STS-1 synchronous payload envelope streams to a stream of 9 byte column×255 byte row containers;

to each said 9 byte×255 byte container, pre-pending a set of pointer bytes indicating start positions of each of a plurality of said STS-1 synchronous payload envelopes within said container;

for each said container, adding a plurality of redundant stuff bytes; and for each said container adding a set of container overhead bytes.

26. The method as claimed in claim 25, further comprising the step of adding a set of STM-1 section overhead bytes to each said container to create an STM-1 frame stream.

27. A method of converting payload data between a VC-3 virtual container and an STS-1 synchronous payload envelope, said method comprising the steps of:

reading a first set of pointer bytes, said first set of pointer bytes pointing to a position within said VC-4 virtual container of each of a plurality of VC-3 virtual containers;

reading bytes of first, second and third VC-3 virtual containers from positions within said VC-4 virtual container indicated by said first set of pointer bytes;

generating an STS-3C synchronous payload envelope;

determining start positions within an STS-3C synchronous payload envelope of each of a plurality of STS-1 synchronous payload envelopes;

determining positions within said STS-1 synchronous payload envelopes of each of a plurality of redundant stuff bytes;

determining a set of STS-1 synchronous payload envelopes pointer byte values for pointing to said start positions of said plurality of STS-1 synchronous payload envelopes within said STS-3C synchronous payload envelopes;

determining a set of pointer byte values for pointing to said positions of said redundant stuff bytes within said STS-1 synchronous payload envelopes; and writing said bytes of said first, second and third VC-3 virtual containers into positions within said STS-3C synchronous payload envelopes allocated for said plurality of said STS-1 SPEs, wherein said step of determining a set of pointer byte values for pointing to said positions of said redundant stuff bytes within a said STS-1 synchronous payload envelope comprises:

writing said STS-1 synchronous payload envelope as a 9 byte row×87 byte column array, and setting said pointer byte values to point to a first byte of a $30^{th}$ said column and to a first byte of a $59^{th}$ said column.

28. A method of converting payload data between a VC-3 virtual container and an STS-1 synchronous payload envelope, said method comprising the steps of:

reading a first set of pointer bytes, said first set of pointer bytes pointing to a position within said VC-4 virtual container of each of a plurality of VC-3 virtual containers;

reading bytes of first, second and third VC-3 virtual containers from positions within said VC-4 virtual container indicated by said first set of pointer bytes;

generating an STS-3C synchronous payload envelope;

determining start positions within an STS-3C synchronous payload envelope of each of a plurality of STS-1 synchronous payload envelopes;

determining positions within said STS-1 synchronous payload envelopes of each of a plurality of redundant stuff bytes;

determining a set of STS-1 synchronous payload envelopes pointer byte values for pointing to said start positions of said plurality of STS-1 synchronous payload envelopes within said STS-3C synchronous payload envelopes;

determining a set of pointer byte values for pointing to said positions of said redundant stuff bytes within said STS-1 synchronous payload envelopes; and writing said bytes of said first, second and third VC-3 virtual containers into positions within said STS-3C synchronous payload envelopes allocated for said plurality of said STS-1 SPEs, wherein said step of determining start positions within the STS-3C synchronous payload envelope of each of a plurality of STS-1 synchronous payload envelopes comprises the steps of:

allocating a memory area for storing an array of 9 rows of bytes×261 columns of bytes; and setting said start positions of said plurality of said STS-1 synchronous payload envelopes as being at a first byte of a first said column, a first byte of a second said column and a first byte of a third said column.

29. A method of converting payload data between a VC-3 virtual container and an STS-1 synchronous payload envelope, said method comprising the steps of:

reading a first set of pointer bytes, said first set of pointer bytes pointing to a position within said VC-4 virtual container of each of a plurality of VC-3 virtual containers;

reading bytes of first, second and third VC-3 virtual containers from positions within said VC-4 virtual container indicated by said first set of pointer bytes;

generating an STS-3C synchronous payload envelope;

determining start positions within an STS-3C synchronous payload envelope of each of a plurality of STS-1 synchronous payload envelopes;

determining positions within said STS-1 synchronous payload envelopes of each of a plurality of redundant stuff bytes;

determining a set of STS-1 synchronous payload envelopes pointer byte values for pointing to said start positions of said plurality of STS-1 synchronous payload envelopes within said STS-3C synchronous payload envelopes;

determining a set of pointer byte values for pointing to said positions of said redundant stuff bytes within said STS-1 synchronous payload envelopes; and writing said bytes of said first, second and third VC-3 virtual containers into positions within said STS-3C synchronous payload envelopes allocated for said plurality of said STS-1 SPEs, wherein said step of writing- bytes of said first, second and third VC-3 -virtual containers into STS-3C synchronous payload envelopes comprises:

writing each of a plurality of columns of a said VC-3 container to a corresponding respective column in a 9 byte×261 byte memory array comprising a said STS-3C synchronous payload envelope.

30. A method of converting payload data between a VC-3 virtual container and an STS-1 synchronous payload envelope, said method comprising the steps of:

reading a first set of pointer bytes, said first set of pointer bytes pointing to a position within said VC-4 virtual container of each of a plurality of VC-3 virtual containers;

reading bytes of first, second and third VC-3 virtual containers from positions within said VC-4 virtual container indicated by said first set of pointer bytes;

generating an STS-3C synchronous payload envelope;

determining start positions within an STS-3C synchronous payload envelope of each of a plurality of STS-1 synchronous payload envelopes;

determining positions within said STS-1 synchronous payload envelopes of each of a plurality of redundant stuff bytes;

determining a set of STS-1 synchronous payload envelopes pointer byte values for pointing,to said start positions of said plurality of STS-1 synchronous payload envelopes within said STS-3C synchronous payload envelopes;

determining a set of pointer byte values for pointing to said positions of said redundant stuff bytes within said STS-1 synchronous payload envelopes; and writing said bytes of said first, second and third VC-3 virtual containers into positions within said STS-3C synchronous payload envelopes allocated for said plurality of said STS-1 SPEs, wherein a said step of writing bytes of said first, second and third VC-3 virtual containers into positions allocated for said SPS-1 synchronous payload envelopes comprises the steps of:

writing a plurality of columns of said VC-3 virtual containers into columns of a 9 byte row×261 byte column memory array, at positions of the $1^{st}$ to $29^{th}$ byte columns, the $31^{st}$ to $58^{th}$ byte columns, $60^{th}$ to $87^{th}$ byte columns $89^{th}$ to $116^{th}$ byte columns, $118^{th}$ to $146^{th}$ byte columns, $147^{th}$ to $175^{th}$ byte columns, $178^{th}$ to $204^{th}$ byte columns, $209^{th}$ to $235^{th}$ byte columns and $234^{th}$ to $261^{st}$ byte columns.

31. Apparatus for converting payload data between a VC-3 virtual container and an STS-1 synchronous payload envelope, said apparatus comprising:

pointer processing means capable of reading a first set of pointer bytes, said first set of pointer bytes pointing to a position within said VC-4 virtual container of each of a plurality of VC-3 virtual containers;

memory means arranged for storing first, secondhand third read VC-3 virtual containers from positions within said VC-4 virtual container indicated by said first set of pointer bytes;

pointer processing means capable of determining start positions within an STS-3C synchronous payload envelope of a plurality of STS-1 synchronous payload envelopes;

pointer processing means capable of determining positions within said STS-1 synchronous payload envelopes of a plurality of redundant stuff bytes;

pointer processing means capable of determining a set of pointer byte values for pointing to said start positions of said STS-1 synchronous payload envelopes within said STS-3C synchronous payload envelopes;

pointer processing means capable of determining a set of pointer byte values for pointing to said positions of said redundant stuff bytes within said STS-1 synchronous payload envelopes; and memory means arranged for storing said VC-3 virtual container payload data in a memory area allocated for said STS-3C synchronous payload envelope at memory positions corresponding to said plurality of said STS-1 SPEs within said STS-3C SPE, wherein said pointer processing means determine a set of pointer byte values for pointing to said positions of said redundant stuff bytes within a said STS-1 synchronous payload envelope, wherein said STS-1 synchronous payload envelope is written as a 9 byte row×87 byte column array, and said pointer byte values are set to point to a first byte of a 30$^{th}$ said column and to a first byte of a 59$^{th}$ said column.

32. Apparatus for converting payload data between a VC-3 virtual container and an STS-1 synchronous payload envelope, said apparatus comprising:

pointer processing means capable of reading a first set of pointer bytes, said first set of pointer bytes pointing to a position within said VC-4 virtual container of each of a plurality of VC-3 virtual containers;

memory means arranged for storing first, second and third read VC-3 virtual containers from positions within said VC-4 virtual container indicated by said first set of pointer bytes;

pointer processing means capable of determining start positions within an STS-3C synchronous payload envelope of a plurality of STS-1 synchronous payload envelopes;

pointer processing means capable of determining positions within said STS-1 synchronous payload envelopes of a plurality of redundant stuff bytes;

pointer processing means capable of determining a set of pointer byte values for pointing to said start positions of said STS-1 synchronous payload envelopes within said STS-3C synchronous payload envelopes;

pointer processing means capable of determining a set of pointer byte values for pointing to said positions of said redundant stuff bytes within said STS-1 synchronous payload envelopes; and memory means arranged for storing said VC-3 virtual container payload data in a memory area allocated for said STS-3C synchronous payload envelope at memory positions corresponding to said plurality of said STS-1 SPEs within said STS-3C SPE, wherein said pointer processing means determine start positions within the STS-3C synchronous payload envelope of each of a plurality of STS-1 synchronous payload envelopes by allocating a memory area for storing an array of 9 rows of bytes×261 columns of bytes; and setting said start positions of said plurality of said STS-1 synchronous payload envelopes as being at a first byte of a first said column, a first byte of a second said column and a first byte of a third said column.

33. Apparatus for converting payload data between a VC-3 virtual container and an STS-1 synchronous payload envelope, said apparatus comprising:

pointer processing means capable of reading a first set of pointer bytes, said first set of pointer bytes pointing to a position within said VC-4 virtual container of each of a plurality of VC-3 virtual containers;

memory means arranged for storing first, second and third read VC-3 virtual containers from positions within said VC-4 virtual container indicated by said first set of pointer bytes;

pointer processing means capable of determining start positions within an STS-3C synchronous payload envelope of a plurality of STS-1 synchronous payload envelopes;

pointer processing means capable of determining positions within said STS-1 synchronous payload envelopes of a plurality of redundant stuff bytes;

pointer processing means capable of determining a set of pointer, byte values for pointing to said start positions of said STS-1 synchronous payload envelopes within said STS-3C synchronous payload envelopes;

pointer processing means capable of determining a set of pointer byte values for pointing to said positions of said redundant stuff bytes within said, STS-1 synchronous payload envelopes; and memory means arranged for storing said VC-3 virtual container payload data in a memory area allocated for said STS-3C synchronous payload envelope at memory positions corresponding to said plurality of said STS-1 SPEs within said STS-3C SPE, wherein said pointer processing means write bytes of said first, second and third VC-3 virtual containers into STS-3C synchronous payload envelopes by writing each of a plurality of columns of a said VC-3 container to a corresponding respective column in a 9 byte×261 byte memory array comprising a said STS-3C synchronous payload envelope.

34. Apparatus for converting payload data between a VC-3 virtual container and an STS-1 synchronous payload envelope, said apparatus comprising:

pointer processing means capable of reading a first set of pointer bytes, said first set of pointer bytes pointing to a position within said VC-4 virtual container of each of a plurality of VC-3 virtual containers;

memory means arranged for storing first, second and third read VC-3 virtual containers from positions within said VC-4 virtual container indicated by said first set of pointer bytes;

pointer processing means capable of determining start positions within an STS-3C synchronous payload envelope of a plurality of STS-1 synchronous payload envelopes;

pointer processing means capable of determining positions within said STS-1 synchronous payload envelopes of a plurality of redundant stuff bytes;

pointer processing means capable of determining a set of pointer byte values for pointing to said start positions of said STS-1 synchronous payload envelopes within said STS-3C synchronous payload envelopes;

pointer processing means capable of determining a set of pointer byte values for pointing to said positions of said redundant stuff bytes within said STS-1 synchronous payload envelopes; and memory means arranged for storing said VC-3 virtual container payload data in a memory area allocated for said STS-3C synchronous payload envelope at memory positions corresponding said plurality of said STS-1 SPEs within said STS-3C SPE, wherein said pointer processing means write bytes of said first, second and third VC-3 virtual containers into positions allocated for said SPS-1 synchronous payload envelopes by writing a plurality of columns of said VC-3 virtual containers into columns of a 9 byte column memory array, at positions of the 1$^{st}$ to 29$^{th}$ byte columns, the 31$^{st}$ to 58$^{th}$ byte columns, 60$^{th}$ to 87$^{th}$ byte columns, 89$^{th}$ to 116$^{th}$ byte columns, 118$^{th}$ to 146$^{th}$ byte columns, 147$^{th}$ to 75$^{th}$ byte columns, 178$^{th}$ to 204$^{th}$ byte columns, 209$^{th}$ to 235$^{th}$ byte columns and 234$^{th}$ to 261$^{st}$ byte columns.

* * * * *